United States Patent
Talagala et al.

(10) Patent No.: US 10,509,776 B2
(45) Date of Patent: Dec. 17, 2019

(54) TIME SEQUENCE DATA MANAGEMENT

(71) Applicant: Fusion-io. Inc., Salt Lake City, UT (US)

(72) Inventors: Nisha Talagala, Livermore, CA (US); Swaminathan Sundararaman, Santa Clara, CA (US); Sriram Subramanian, Santa Clara, CA (US); James Peterson, San Jose, CA (US); David Flynn, Sandy, UT (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 618 days.

(21) Appl. No.: 13/830,809

(22) Filed: Mar. 14, 2013

(65) Prior Publication Data
US 2014/0089265 A1     Mar. 27, 2014

Related U.S. Application Data

(60) Provisional application No. 61/705,058, filed on Sep. 24, 2012, provisional application No. 61/726,316, filed on Nov. 14, 2012.

(51) Int. Cl.
*G06F 16/22* (2019.01)
*G06F 16/2458* (2019.01)

(52) U.S. Cl.
CPC .......... *G06F 16/22* (2019.01); *G06F 16/2477* (2019.01)

(58) Field of Classification Search
USPC ....................................................... 707/674
See application file for complete search history.

(56) References Cited

U.S. PATENT DOCUMENTS

| | | |
|---|---|---|
| 4,571,674 A | 2/1986 | Hartung |
| 5,193,184 A | 3/1993 | Belsan et al. |
| 5,261,068 A | 11/1993 | Gaskins et al. |
| 5,307,497 A | 4/1994 | Feigenbaum et al. |
| 5,325,509 A | 6/1994 | Lautzenheiser |
| 5,392,427 A | 2/1995 | Barrett et al. |
| 5,404,485 A | 4/1995 | Ban |
| 5,438,671 A | 8/1995 | Miles |
| 5,469,555 A | 11/1995 | Ghosh et al. |
| 5,499,354 A | 3/1996 | Aschoff et al. |
| 5,504,882 A | 4/1996 | Chai |
| 5,535,399 A | 7/1996 | Blitz et al. |

(Continued)

FOREIGN PATENT DOCUMENTS

| | | |
|---|---|---|
| CN | 1771495 | 5/2006 |
| EP | 1418502 | 10/2003 |

(Continued)

OTHER PUBLICATIONS

U.S. Appl. No. 13/424,333, Office Action, dated Mar. 17, 2014.

(Continued)

*Primary Examiner* — Muluemebet Gurmu
(74) *Attorney, Agent, or Firm* — Kunzler, Bean & Adamson, PC

(57) ABSTRACT

An apparatus, system, and method are disclosed for data management. The method includes writing data in a sequential log structure. The method also includes receiving a time sequence request from a client. The method further includes servicing the time sequence request based on a temporal order of the data in the sequential log structure.

22 Claims, 11 Drawing Sheets

(56) References Cited

U.S. PATENT DOCUMENTS

| | | |
|---|---|---|
| 5,553,261 A | 9/1996 | Hasbun et al. |
| 5,586,291 A | 12/1996 | Lasker et al. |
| 5,594,883 A | 1/1997 | Pricer |
| 5,596,736 A | 1/1997 | Kerns |
| 5,598,370 A | 1/1997 | Nijima et al. |
| 5,651,133 A | 7/1997 | Burkes |
| 5,680,579 A | 10/1997 | Young et al. |
| 5,682,497 A | 10/1997 | Robinson |
| 5,682,499 A | 10/1997 | Bakke et al. |
| 5,701,434 A | 12/1997 | Nakagawa |
| 5,745,792 A | 4/1998 | Jost |
| 5,754,563 A | 5/1998 | White |
| 5,757,567 A | 5/1998 | Hetzler et al. |
| 5,787,486 A | 7/1998 | Chin et al. |
| 5,794,253 A * | 8/1998 | Norin et al. |
| 5,802,602 A | 9/1998 | Rahman et al. |
| 5,809,527 A | 9/1998 | Cooper et al. |
| 5,809,543 A | 9/1998 | Byers et al. |
| 5,835,935 A | 11/1998 | Estakhri et al. |
| 5,845,329 A | 12/1998 | Onishi et al. |
| 5,930,815 A | 7/1999 | Estakhri et al. |
| 5,957,158 A | 9/1999 | Volz et al. |
| 5,960,462 A | 9/1999 | Solomon et al. |
| 5,996,054 A | 11/1999 | Ledain et al. |
| 6,000,019 A | 12/1999 | Dykstal et al. |
| 6,014,724 A | 1/2000 | Jennett |
| 6,073,232 A | 6/2000 | Kroeker et al. |
| 6,101,601 A | 8/2000 | Mathews et al. |
| 6,170,039 B1 | 1/2001 | Kishida |
| 6,170,047 B1 | 1/2001 | Dye |
| 6,173,381 B1 | 1/2001 | Dye |
| 6,185,654 B1 | 2/2001 | Van Doren |
| 6,209,088 B1 | 3/2001 | Reneris |
| 6,236,593 B1 | 5/2001 | Hong et al. |
| 6,256,642 B1 | 7/2001 | Krueger et al. |
| 6,279,069 B1 | 8/2001 | Robinson et al. |
| 6,289,413 B1 | 9/2001 | Rogers et al. |
| 6,330,642 B1 | 12/2001 | Carteau |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,911 B1 | 1/2003 | Langford |
| 6,523,102 B1 | 2/2003 | Dye et al. |
| 6,564,285 B1 | 5/2003 | Mills |
| 6,587,915 B1 | 7/2003 | Kim |
| 6,601,211 B1 | 7/2003 | Norman |
| 6,625,684 B1 | 9/2003 | Casey et al. |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,715,027 B2 | 3/2004 | Kim et al. |
| 6,751,155 B2 | 6/2004 | Gorobets |
| 6,754,774 B2 | 6/2004 | Gruner et al. |
| 6,775,185 B2 | 8/2004 | Fujisawa et al. |
| 6,779,088 B1 | 8/2004 | Benveniste et al. |
| 6,785,776 B2 | 8/2004 | Arimilli et al. |
| 6,785,785 B2 | 8/2004 | Piccirillo et al. |
| 6,877,076 B1 | 4/2005 | Cho et al. |
| 6,880,049 B2 | 4/2005 | Gruner et al. |
| 6,883,069 B2 | 4/2005 | Yoshida |
| 6,883,079 B1 | 4/2005 | Priborsky |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,981,070 B1 | 12/2005 | Luk et al. |
| 6,996,676 B2 | 2/2006 | Megiddo |
| 7,010,652 B2 | 3/2006 | Piccirillo et al. |
| 7,013,376 B2 | 3/2006 | Hooper, III |
| 7,013,379 B1 | 3/2006 | Testardi |
| 7,035,974 B2 | 4/2006 | Shang |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,076,599 B2 | 7/2006 | Aasheim |
| 7,089,391 B2 | 8/2006 | Geiger et al. |
| 7,096,321 B2 | 8/2006 | Modha |
| 7,130,956 B2 | 10/2006 | Rao |
| 7,130,957 B2 | 10/2006 | Rao |
| 7,167,953 B2 | 1/2007 | Megiddo et al. |
| 7,171,536 B2 | 1/2007 | Chang |
| 7,173,852 B2 | 2/2007 | Gorobets |
| 7,181,572 B2 | 2/2007 | Walmsley |
| 7,194,577 B2 | 3/2007 | Johnson et al. |
| 7,194,740 B1 | 3/2007 | Frank et al. |
| 7,203,815 B2 | 4/2007 | Haswell |
| 7,219,238 B2 | 5/2007 | Saito et al. |
| 7,243,203 B2 | 7/2007 | Scheuerlein |
| 7,246,179 B2 | 7/2007 | Camara et al. |
| 7,254,686 B2 | 8/2007 | Islam |
| 7,275,135 B2 | 9/2007 | Coulson |
| 7,280,536 B2 | 10/2007 | Testardi |
| 7,293,183 B2 | 11/2007 | Lee et al. |
| 7,305,520 B2 | 12/2007 | Voight et al. |
| 7,328,307 B2 | 2/2008 | Hoogterp |
| 7,340,558 B2 | 3/2008 | Lee et al. |
| 7,340,566 B2 | 3/2008 | Voth |
| 7,356,651 B2 | 4/2008 | Liu et al. |
| 7,360,015 B2 | 4/2008 | Mathews et al. |
| 7,366,808 B2 | 4/2008 | Kano et al. |
| 7,398,348 B2 | 7/2008 | Moore et al. |
| 7,418,465 B1 | 8/2008 | Lewis et al. |
| 7,437,510 B2 | 10/2008 | Rosenbluth et al. |
| 7,447,847 B2 | 11/2008 | Louie et al. |
| 7,450,420 B2 | 11/2008 | Sinclair et al. |
| 7,464,221 B2 | 12/2008 | Nakamura |
| 7,487,235 B2 | 2/2009 | Andrews et al. |
| 7,487,320 B2 | 2/2009 | Bansal et al. |
| 7,526,614 B2 | 4/2009 | Van Riel |
| 7,536,491 B2 | 5/2009 | Kano et al. |
| 7,552,271 B2 | 6/2009 | Sinclair et al. |
| 7,580,287 B2 | 8/2009 | Aritome |
| 7,620,773 B2 | 11/2009 | Nicholson |
| 7,640,390 B2 | 12/2009 | Iwamura et al. |
| 7,644,239 B2 | 1/2010 | Ergan et al. |
| 7,664,239 B2 | 1/2010 | Groff et al. |
| 7,657,717 B1 | 2/2010 | Karr et al. |
| 7,660,911 B2 | 2/2010 | McDaniel |
| 7,660,941 B2 | 2/2010 | Lee |
| 7,669,019 B2 | 2/2010 | Fujibayashi |
| 7,676,628 B1 | 3/2010 | Compton et al. |
| 7,702,873 B2 | 4/2010 | Greiss et al. |
| 7,721,059 B2 | 5/2010 | Mylly |
| 7,725,628 B1 | 5/2010 | Phan et al. |
| 7,831,783 B2 | 11/2010 | Pandit |
| 7,853,772 B2 | 12/2010 | Chang et al. |
| 7,873,782 B2 | 1/2011 | Terry |
| 7,873,803 B2 | 1/2011 | Cheng |
| 7,882,305 B2 | 2/2011 | Moritoki |
| 7,904,647 B2 | 3/2011 | El-Batal |
| 7,913,051 B1 | 3/2011 | Todd et al. |
| 7,917,803 B2 | 3/2011 | Stefanus |
| 7,941,591 B2 | 5/2011 | Aviles |
| 7,984,230 B2 | 7/2011 | Nasu et al. |
| 8,046,526 B2 | 10/2011 | Yeh |
| 8,055,820 B2 | 11/2011 | Sebire |
| 8,127,103 B2 | 2/2012 | Kano |
| 8,135,900 B2 | 3/2012 | Kunimatsu |
| 8,135,907 B2 | 3/2012 | Moore |
| 8,151,082 B2 | 4/2012 | Flynn et al. |
| 8,171,204 B2 | 5/2012 | Chow et al. |
| 8,214,583 B2 | 7/2012 | Sinclair et al. |
| 8,392,428 B1 | 3/2013 | Bonwick et al. |
| 8,589,362 B1 * | 11/2013 | Braam et al. .................. 707/695 |
| 8,627,005 B1 | 1/2014 | Bradford et al. |
| 10,102,144 B2 | 10/2018 | Sundararaman et al. |
| 2002/0069318 A1 | 6/2002 | Chow |
| 2002/0103819 A1 * | 8/2002 | Duvillier ........... G06F 17/30356 |

(56) References Cited

U.S. PATENT DOCUMENTS

| | | |
|---|---|---|
| 2002/0161855 A1 | 10/2002 | Manczak et al. |
| 2002/0181134 A1 | 12/2002 | Bunker et al. |
| 2003/0061296 A1 | 3/2003 | Craddock et al. |
| 2003/0140051 A1 | 7/2003 | Fujiwara |
| 2003/0145230 A1 | 7/2003 | Chiu et al. |
| 2003/0149753 A1 | 8/2003 | Lamb |
| 2003/0163630 A1 | 8/2003 | Aasheim et al. |
| 2003/0163663 A1 | 8/2003 | Aasheim et al. |
| 2003/0198084 A1 | 10/2003 | Fujisawa |
| 2004/0003002 A1 | 1/2004 | Adelmann |
| 2004/0064647 A1 | 4/2004 | DeWhitt et al. |
| 2004/0093463 A1 | 5/2004 | Shang |
| 2004/0117586 A1 | 6/2004 | Estakhri et al. |
| 2004/0148360 A1 | 7/2004 | Mehra et al. |
| 2004/0186946 A1 | 9/2004 | Lee |
| 2004/0225719 A1 | 11/2004 | Kisley et al. |
| 2004/0268359 A1 | 12/2004 | Hanes |
| 2005/0002263 A1 | 1/2005 | Iwase |
| 2005/0015539 A1 | 1/2005 | Horii |
| 2005/0018527 A1 | 1/2005 | Gorobets |
| 2005/0027951 A1 | 2/2005 | Piccirillo et al. |
| 2005/0120177 A1 | 6/2005 | Black |
| 2005/0141313 A1 | 6/2005 | Gorobets |
| 2005/0144360 A1 | 6/2005 | Bennett |
| 2005/0177687 A1 | 8/2005 | Rao |
| 2005/0193166 A1 | 9/2005 | Johnson |
| 2005/0216653 A1 | 9/2005 | Aasheim et al. |
| 2005/0240713 A1 | 10/2005 | Wu |
| 2005/0246510 A1 | 11/2005 | Retnamma et al. |
| 2005/0257017 A1 | 11/2005 | Yagi |
| 2005/0273476 A1 | 12/2005 | Wertheimer |
| 2006/0004955 A1 | 1/2006 | Ware |
| 2006/0020744 A1 | 1/2006 | Sinclair |
| 2006/0026339 A1 | 2/2006 | Rostampour |
| 2006/0059326 A1 | 3/2006 | Aasheim et al. |
| 2006/0064556 A1 | 3/2006 | Aasheim et al. |
| 2006/0075057 A1 | 4/2006 | Gildea et al. |
| 2006/0085471 A1 | 4/2006 | Rajan et al. |
| 2006/0085626 A1 | 4/2006 | Roberson et al. |
| 2006/0129778 A1 | 6/2006 | Clark et al. |
| 2006/0136657 A1 | 6/2006 | Rudelic et al. |
| 2006/0143396 A1 | 6/2006 | Cabot |
| 2006/0149893 A1 | 7/2006 | Barfuss et al. |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0224849 A1 | 10/2006 | Islam |
| 2006/0236061 A1 | 10/2006 | Koclanes |
| 2006/0248387 A1 | 11/2006 | Nicholson et al. |
| 2006/0265636 A1 | 11/2006 | Hummler |
| 2007/0008852 A1 | 1/2007 | Kobayashi |
| 2007/0016699 A1 | 1/2007 | Minami |
| 2007/0022148 A1 | 1/2007 | Akers et al. |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050571 A1 | 3/2007 | Nakamura |
| 2007/0061508 A1 | 3/2007 | Zweighaft |
| 2007/0086260 A1 | 4/2007 | Sinclair |
| 2007/0088666 A1 | 4/2007 | Saito |
| 2007/0118676 A1 | 5/2007 | Kano |
| 2007/0118713 A1 | 5/2007 | Guterman |
| 2007/0124540 A1 | 5/2007 | van Riel |
| 2007/0136555 A1 | 6/2007 | Sinclair et al. |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0143567 A1 | 6/2007 | Gorobets |
| 2007/0147356 A1 | 6/2007 | Gorobets |
| 2007/0150689 A1 | 6/2007 | Pandit |
| 2007/0156998 A1 | 7/2007 | Gorobets |
| 2007/0168698 A1 | 7/2007 | Coulson et al. |
| 2007/0198770 A1 | 8/2007 | Horii |
| 2007/0204128 A1 | 8/2007 | Lee |
| 2007/0208790 A1 | 9/2007 | Reuter et al. |
| 2007/0233937 A1 | 10/2007 | Coulson et al. |
| 2007/0255891 A1 | 11/2007 | Chow et al. |
| 2007/0260608 A1 | 11/2007 | Hertzberg et al. |
| 2007/0261030 A1 | 11/2007 | Wadhwa |
| 2007/0263514 A1 | 11/2007 | Iwata |
| 2007/0266037 A1 | 11/2007 | Terry |
| 2007/0274150 A1 | 11/2007 | Gorobets |
| 2007/0300008 A1 | 12/2007 | Rogers et al. |
| 2008/0010395 A1 | 1/2008 | Mylly et al. |
| 2008/0052377 A1 | 2/2008 | Light |
| 2008/0052477 A1 | 2/2008 | Lee |
| 2008/0091876 A1 | 4/2008 | Fujibayashi et al. |
| 2008/0109543 A1* | 5/2008 | Abanami et al. ............. 709/223 |
| 2008/0120469 A1 | 5/2008 | Kornegay |
| 2008/0126507 A1 | 5/2008 | Wilkinson |
| 2008/0126700 A1 | 5/2008 | El-Batal |
| 2008/0140737 A1 | 6/2008 | Garst et al. |
| 2008/0155169 A1 | 6/2008 | Hiltgen et al. |
| 2008/0209090 A1 | 8/2008 | Kano |
| 2008/0222219 A1* | 9/2008 | Varadarajan ...... G06F 17/30088 |
| 2008/0229045 A1 | 9/2008 | Qi |
| 2008/0235443 A1 | 9/2008 | Chow et al. |
| 2008/0243966 A1 | 10/2008 | Croisettier |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0276040 A1 | 11/2008 | Moritoki |
| 2008/0294847 A1 | 11/2008 | Maruyama et al. |
| 2009/0070526 A1 | 3/2009 | Tetrick |
| 2009/0083478 A1 | 3/2009 | Kunimatsu |
| 2009/0083485 A1 | 3/2009 | Cheng |
| 2009/0089483 A1 | 4/2009 | Tanaka et al. |
| 2009/0089485 A1 | 4/2009 | Yeh |
| 2009/0125650 A1 | 5/2009 | Sebire |
| 2009/0125700 A1 | 5/2009 | Kisel |
| 2009/0150599 A1* | 6/2009 | Bennett .................. 711/103 |
| 2009/0150605 A1 | 6/2009 | Flynn et al. |
| 2009/0150641 A1* | 6/2009 | Flynn ..................... G06F 3/061 711/202 |
| 2009/0172257 A1 | 7/2009 | Prins et al. |
| 2009/0228637 A1 | 9/2009 | Moon |
| 2009/0248763 A1 | 10/2009 | Rajan |
| 2009/0249001 A1* | 10/2009 | Narayanan et al. .......... 711/161 |
| 2009/0276588 A1 | 11/2009 | Murase |
| 2009/0276654 A1 | 11/2009 | Butterworth |
| 2009/0287887 A1 | 11/2009 | Matsuki |
| 2009/0292861 A1 | 11/2009 | Kanevsky et al. |
| 2009/0300277 A1 | 12/2009 | Jeddeloh |
| 2009/0307424 A1 | 12/2009 | Galloway et al. |
| 2009/0313453 A1 | 12/2009 | Stefanus |
| 2009/0313503 A1 | 12/2009 | Atluri et al. |
| 2009/0327602 A1 | 12/2009 | Moore |
| 2009/0327804 A1 | 12/2009 | Moshayedi |
| 2010/0005228 A1 | 1/2010 | Fukutomi |
| 2010/0017556 A1 | 1/2010 | Chin |
| 2010/0023674 A1 | 1/2010 | Aviles |
| 2010/0023676 A1 | 1/2010 | Moon |
| 2010/0023682 A1 | 1/2010 | Lee |
| 2010/0030946 A1 | 2/2010 | Kano |
| 2010/0095059 A1 | 4/2010 | Kisley et al. |
| 2010/0076936 A1 | 5/2010 | Rajan |
| 2010/0153617 A1 | 6/2010 | Miroshnichenko et al. |
| 2010/0169542 A1 | 7/2010 | Sinclair |
| 2010/0191713 A1 | 7/2010 | Lomet |
| 2010/0205231 A1 | 8/2010 | Cousins |
| 2010/0205335 A1 | 8/2010 | Phan et al. |
| 2010/0211737 A1 | 8/2010 | Flynn |
| 2010/0235597 A1 | 9/2010 | Arakawa |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |

(56) References Cited

U.S. PATENT DOCUMENTS

| | | | |
|---|---|---|---|
| 2010/0262767 | A1 | 10/2010 | Borchers et al. |
| 2010/0262773 | A1 | 10/2010 | Borchers et al. |
| 2010/0262894 | A1 | 10/2010 | Swing et al. |
| 2010/0262979 | A1 | 10/2010 | Borchers et al. |
| 2011/0022819 | A1 | 1/2011 | Post et al. |
| 2011/0119455 | A1 | 5/2011 | Tsai et al. |
| 2011/0153977 | A1 | 6/2011 | Root et al. |
| 2011/0296133 | A1 | 12/2011 | Flynn et al. |
| 2012/0011340 | A1 | 1/2012 | Flynn et al. |
| 2012/0030408 | A1 | 2/2012 | Flynn et al. |
| 2012/0137303 | A1 | 5/2012 | Okada et al. |
| 2013/0144844 | A1 | 6/2013 | Ito et al. |
| 2013/0227236 | A1 | 8/2013 | Flynn et al. |
| 2013/0311990 | A1 | 11/2013 | Chuanbin et al. |
| 2013/0332660 | A1 | 12/2013 | Talagala et al. |
| 2014/0089264 | A1 | 3/2014 | Talagala et al. |
| 2014/0215127 | A1 | 7/2014 | Perrin et al. |
| 2014/0310499 | A1 | 10/2014 | Sundararaman |
| 2014/0344507 | A1 | 11/2014 | Piggin et al. |

FOREIGN PATENT DOCUMENTS

| | | |
|---|---|---|
| EP | 1814039 | 12/2006 |
| GB | 0123416 | 9/2001 |
| JP | 04242848 | 8/1992 |
| JP | 08153014 | 6/1996 |
| JP | 2000259525 | 9/2000 |
| JP | 2009122850 | 4/2009 |
| WO | 94019746 | 9/1994 |
| WO | 95018407 | 7/1995 |
| WO | 96012225 | 4/1996 |
| WO | 0201365 | 1/2002 |
| WO | 2004099989 | 11/2004 |
| WO | 2005103878 | 11/2005 |
| WO | 2006062511 | 6/2006 |
| WO | 2006065626 | 6/2006 |
| WO | 2008073421 | 6/2008 |
| WO | 2008130799 | 10/2008 |
| WO | 2008130799 A1 | 10/2008 |
| WO | 2008070173 | 12/2008 |
| WO | 2011106394 | 1/2011 |

OTHER PUBLICATIONS

U.S. Appl. No. 14/030,717, Office Action, dated Apr. 11, 2014.
"Design and Use Considerations for NAND Flash Memory", Micron Technical Note, 2006, pp. 8, TN-29-17: NAND Flash Design and Use Considerations.
Bonnet, "Flash Device Support for Database Management", 5th Biennial Conference on Innovative Data Systems Research, Jan. 9-12, 2011, pp. 8, Asilomar, California, US.
Gal, Eran, "A Transactional Flash File System for Microcontrollers", USENIX Association, 2005, pp. 16, USENIX Annual Technical Conference.
Garfinkel, Simson L. "One Big File Is Not Enough", Harvard University, Jun. 28, 2006, pp. 31.
Gutmann, Peter, "Secure Deletion of Data from Magnetic and Solid-State Memory", Sixth USENIX Security Symposium, Jul. 22-25, 1996, pp. 18, San Jose, California, US.
"How NTFS Works", Updated Mar. 28, 2003, pp. 34, http://technet.microsoft.com/en-us/library/cc781134(WS.10).aspx.
"Hystor: Making SSDs the 'Survival of the Fittest' in High-Performance Storage Systems", Feb. 2010, pp. 14.
Weber, Ralph O., "Information Technology—SCSI Object-Based Storage Device Commands (OSD)", Seagate Technology, Jul. 30, 2004, pp. 171, Project T10/1355-D, Revision 10, Reference No. ISO/IEC 14776-391 : 200x ANSI INCITS.***:200x.
"Introduction to Samsung's Linux Flash File System—RFS", Samsung Electronics Application Note, Nov. 2006, Version 1.0, pp. 6.
Kawaguchi, Atsuo, "A Flash-Memory Based File System", Advanced Research Laboratory, Hitachi, Ltd., 1995, Hatoyama, Saitama, JP.
Mesnier, Mike, "Object-Based Storage", IEEE Communications Magazine, Aug. 2003, pp. 84-90.
IBM, "Method to Improve Reliability of SSD Arrays", ip.com PriorArtDatabase Technical Disclosure, Nov. 5, 2009, pp. 6, IPCOM000189338D, www.ip.com.
Morgenstern, David, "Is There a Flash Memory RAID in Your Future?" Ziff Davis Enterprise Holdings, Inc., Nov. 8, 2006, pp. 4, http://www.eweek.com.
Arpaci-Dusseau, Andrea C., "Removing the Costs of Indirection in Flash-based SSDs with Nameless Writes", University of Wisconsin-Madison and Microsoft Research, Jun. 2010, pp. 5.
"Non-Volatile Memory Host Controller Interface (NVMHCI) Working Group Announces 1.0 Specification", VNMHCI Working Group, Apr. 15, 2008, pp. 2, http://www.businesswire.com/news/home/20080415005169/en/Non-Volatile.
"File System Primer", CoolSolutionsWiki, downloaded Oct. 18, 2006, pp. 5, http://wiki.novell.com/index.php/File_System_Primer.
"Open NAND Flash Interface Specification", Hynix Semiconductor, et al., Feb. 27, 2008, pp. 174, Revision 2.0, Open NAND Fllash Interface.
Plank, James S., "A Tutorial on Reed-Solomon Coding for Fault-Tolerance in RAID-like Systems", 1999, pp. 19, Technical Report CS-96-332, Department of Computer Science, University of Tennessee, http://www.cs.utk.edu/plank/papers/CS-03-504.html.
Porter, Donald, E., Operating System Transactions, SOSP, Oct. 11-14, 2009, pp. 20, Big Sky, Montana, US.
"IoDrive—Frequently Asked Questions", Clustered Storage Solutions: Products, downloaded Feb. 16, 2010, pp. 2, http://www.clusteredstorage.com/clustered_storage_solutions.html.
Rosenblum, Mendel, "The Design and Implementation of a Log-structured File System", 1992, pp. 101.
Sears, Russell, "Stasis: Flexible Transactional Storage", OSDI, 2006, pp. 16, http://www.cs.berkeley.edu/~sears/stasis/.
Seltzer, Margo Ilene, "File System Performance and Transaction Support", A. B. Harvard/Radcliffe College, 1992, pp. 131.
Seltzer, Margo I., "Transaction Support in a Log-Structured File System", Harvard University Division of Applied Sciences, Jan. 1, 1993, pp. 8.
Seltzer, Margo, "Transaction Support in Read Optimized and Write Optimized File Systems", 1990, pp. 12, Proceedings of the 16th VLDB Conference, Brisbane, Australia.
"Data Management Software (DMS) for AMD Simultaneous Read/Write Flash Memory Devices", Spansion, Jul. 2003, pp. 10, Publication No. 22274, Revision A. Amendment 0, Issue Date, Nov. 1, 1998.
Spillane, Richard P., "Enabling Transactional File Access via Lightweight Kernel Extensions", USENIX Association, published Feb. 25, 2009, pp. 14, 7th USENIX conference on File and Storage Technologies.
Tal, Arie, "NAND vs. NOR Flash Technology", M-Systems, posted on Feb. 1, 2002, pp. 3, Newark, California, US.
"Hamming Codes for NAND Flash Memory Devices", Micron Technical Note, 2005, pp. 7, TN-29-08: Hamming Codes for NAND Flash Memory Devices.
TN-29-42: Wear-Leveling Techniques in NAND Flash Devices, Micron Technical Note, 2008, pp. 8.
Van Hensbergen, Eric, "Dynamic Policy Disk Caching for Storage Networking", IBM Research Report, Nov. 28, 2006, pp. 13, RC24123.
Probert, David B., "Windows Kernel Internals", Microsoft Corporation, May 13, 2010, pp. 48.
NAND Flash 101: An Introduction to NAND Flash and How to Design It in to Your Next Product, Micron Technology, Inc., downloaded May 10, 2010, pp. 28, TN-29-19, http://www.micron.com/~/media/Documents/Products/Technical%20Note/NAND%20Flash/145tn2919_nand_101.
Application No. 200780050983.8, Office Action, dated May 18, 2011.
U.S. Appl. No. 12/879,004, Office Action, dated Feb. 25, 2013.
U.S. Appl. No. 12/711,113, Final Office Action, dated Nov. 23, 2012.
"T10/05-270r0 SAT—Write Same (10) command (41h)", Network Appliance, Jul. 7, 2005, pp. 2.
U.S. Appl. No. 12/711,113, Office Action, dated Jun. 6, 2012.

(56) References Cited

OTHER PUBLICATIONS

U.S. Appl. No. 12/986,117, Notice of Allowance, dated Jun. 5, 2013.
U.S. Appl. No. 12/986,117, Office Action, dated Apr. 4, 2013.
U.S. Appl. No. 14/067,323, Office Action, dated Jan. 3, 2014.
U.S. Appl. No. 11/952,109, Office Action, dated Nov. 29, 2011.
U.S. Appl. No. 11/952,109, Office Action, dated May 1, 2012.
Application No. 200780050970.0, Office Action, dated Oct. 28, 2010.
Application No. 200780050970.0, Office Action, dated Jan. 5, 2012.
U.S. Appl. No. 13/118,237, Office Action, dated Apr. 22, 2013.
U.S. Appl. No. 11/952,113, Office Action, dated Mar. 6, 2012.
U.S. Appl. No. 11/952,113, Office Action, dated Dec. 15, 2010.
U.S. Appl. No. 13/607,486, Office Action, dated Jan. 10, 2013.
Application No. 200780051020.X, office Action, dated Nov. 11, 2010.
Application No. 200780051020.X, Office Action, dated Jul. 6, 2011.
Application No. 200780051020.X, Office Action, dated Nov. 7, 2011.
Application No. 07865345.8, Office Action, dated Nov. 17, 2010.
U.S. Appl. No. 13/607,486, Office Action, dated May 2, 2013.
U.S. Appl. No. 60/625,495, Application, filed Nov. 6, 2004.
U.S. Appl. No. 60/718,768, Application, filed Aug. 20, 2005.
U.S. Appl. No. 60/797,127, Application, filed May 3, 2006.
"Actel Fusion FPGAs Supporting Intelligent Peripheral Management Interface (IPMI) Applications", Actel, Oct. 2006, pp. 17, Application Note AC286.
Johnson, Michael K., "An Introduction to Block Device Drivers", Jan. 1, 1995, pp. 6.
"Method for Fault Tolerance in Nonvolatile Storage", ip.com PriorArtDatabase Technical Disclosure, Feb. 3, 2005, pp. 6, IPCOM000042269D, www.ip.com.
Ari, Ismail, "Performance Boosting and Workload Isolation in Storage Area Networks with SANCache", Proceedings of the 23rd IEEE/14th NASA Goddard Conference on Mass Storage Systems and Technologies, May 2006, pp. 263-273, College Park, Maryland, US.
"ASPMC-660 Rugged IDE Flash Disk PMC Module", Asine, downloaded Nov. 18, 2009, pp. 3, http://www.asinegroup.com/products/aspmc660html.
"BiTMICRO Introduces E-Disk PMC Flash Disk Module", Military and Aerospace Electronics East, 2004, pp. 2, http://www.bitmicro.com/press_news_releases?20040518/prt.php.
Brandon, Jr., Daniel, "Sparse Matrices in CS Education", Consortium for Computing Sciences in Colleges, May 2009, pp. 93-98.
Bulletproof Memory for RAID Servers, Part 1-3, agigatech com., 2009, pp. 12, http://agigatech.com/blog/bulletproof-memory-for-raid-servers-part-1/.
Coburn, Joel, "NV-Heaps: Making Persistent Objects Fast and Safe with Next-Generation, Non-Volatile Memories", ASPLOS'II, Mar. 5-11, 2011, pp. 13, Newport Beach, California, US.
Dan, Raz, "Implementing MLC NAND Flash for Cost-Effective, High-Capacity Memory", White Paper M-Systems, Sep. 2003, pp. 13, 92-SR-014-02-8L, Rev. 1.1, Newark, California, US.
Shu, Frank, "Data Set Management Commands Proposal for ATA8-ACS2", Microsoft Corporation, Sep. 5, 2007, pp. 8, Revision 2, Redmond, Washington, US.
"EEL-6892-Virtual Computers", Lecture 18, downloaded Mar. 1, 2010, http://www.acis.ufl.edu/ming/lectures.
"NAND Flash Memories and Programming NAND Flash Memories Using ELNEC Device Programmers", Aug. 2008, pp. 44, Application Note Version 2 Oct. 8, 2008.
Application No. PCT/US2015/012301, International Search Report and Written Opinion, dated Apr. 29, 2015.
Application No. PCT/US2007/086687, International Preliminary Report on Patentability, dated Mar. 18, 2009.
Application No. PCT/US2007/086687, International Search Report and Written Opinion, dated Sep. 5, 2008.
Application No. PCT/US2007/086688, International Preliminary Report on Patentability, dated Mar. 16, 2009.
Application No. 200780050970.0, Office Action, dated Jun. 29, 2011.
Application No. PCT/US2007/086691, International Preliminary Report on Patentability, dated Feb. 16, 2009.
Application No. PCT/US2007/086691, Internaitonal Search Report and Written Opinion, dated May 8, 2008.
Application No. PCT/US2007/086701, International Preliminary Report on Patentability, dated Mar. 16, 2009.
Application No. PCT/US2007/086701, International Search Report and Written Opinion, dated Jun. 5, 2008.
Application No. PCT/US2007/025048, International Preliminary Report on Patentability, dated Jun. 18, 2009.
Application No. PCT/US2007/025048, International Search Report and Written Opinion, dated May 27, 2008.
Application No. PCT/US2010/048325, International Preliminary Report on Patentability, dated Mar. 13, 2012.
Application No. PCT/US2010/048325, International Search Report, dated Jun. 1, 2011.
Application No. PCT/US2012/024930, International Preliminary Report on Patentability, dated Aug. 13, 2013.
Wright, Charles, P., "Amino: Extending ACID Semantics to the File System", pp. 1, Jun. 2007.
"ASPMC-660", ASINE, pp. 3, downloaded Nov. 18, 2009.
Yerrick, Damian, "Block Device,", pp. 3, downloaded Mar. 1, 2010.
Zhang, Yiying, "De-indirection for Flash-based SSDs with Nameless Writes", Computer Sciences Department, University of Wisconsin-Madison, pp. 16, 2012.
Volos, Haris, "Mnemosyne: Lightweight Persistent Memory", ASPLOS 2011, pp. 13, Mar. 5-11, 2011, Newport Beach, California, US.
"Object Storage Device", Wikipedia, pp. 42, downloaded Apr. 29, 2010.
Application No. PCT/US2011/025885, International Search Report and Written Opinion, dated Sep. 28, 2011.
Shimpi, Anand Lal, "The SSD Anthology: Understanding SSDs and New Drives from OCZ", pp. 70, Mar. 18, 2009.
Wacha, Rosie, "Improving RAID-Based Storage Systems with Flash Memory", First Annual ISSDM/SRL Research Symposium, pp. 21, Oct. 20-21, 2009.
Walp, David, "System Integrated Flash Storage", Microsoft Corporation, pp. 8, 2008.
Wu, Michael, "eNVy: A Non-Volatile, Main Memory Storage System", ASPLOS, pp. 12, Oct. 1994, San Jose, California, US.
U.S. Appl. No. 14/253,645, Office Action, dated Oct. 6, 2015.
U.S. Appl. No. 14/253,721 Non-Final Office Action dated Sep. 22, 2016.
Final Office Action U.S. Appl. No. 14/253,645 dated Apr. 6, 2016.
Application No. PCT/US2011/065927, International Preliminary Report on Patentability, dated Jul. 18, 2013.
U.S. Appl. No. 14/253,645 Office Action dated Aug. 4, 2016.
Application No. PCT/US2015/012301 International Preliminary Report on Patentability, dated Aug. 4, 2016.
U.S. Appl. No. 14/253,645 Non-Final Office Action dated Jun. 30, 2017.
U.S. Appl. No. 14/253,721 Non-Final Office Action dated Aug. 10, 2017.
U.S. Appl. No. 141253,721 Final Office Action dated Apr. 20, 2017.
U.S. Appl. No. 14/253,645 Final Office Action dated Feb. 9, 2017.
U.S. Appl. No. 13/939,992 Non-Final Office Action dated Apr. 5, 2016.
U.S. Appl. No. 14/253,721 Final Office Action dated Sep. 20, 2018.
"Couchbase Server Manual 1.8", Couchbase, Feb. 13, 2012, pp. 157, http://www.couchbase.com/docs/couchbase-manual-1.8/index.html.
U.S. Appl. No. 14/253,721 Non-Final Rejection dated Feb. 26, 2018.
U.S. Appl. No. 14/253,645 Notice of Allowance dated Jun. 6, 2018.
U.S. Appl. No. 13/939,992 Final Rejection dated Dec. 13, 2017.
U.S. Appl. No. 13/939,992 Non-Final Rejection dated Jun. 28, 2018.
U.S. Appl. No. 14/253,645 Final Rejection dated Jan. 30, 2018.
U.S. Appl. No. 13/939,992 Notice of Allowance dated Jan. 25, 2019.

* cited by examiner

TIME SEQUENCE DATA MANAGEMENT

CROSS-REFERENCES TO RELATED APPLICATIONS

This application claims the benefit of U.S. Provisional Patent Application No. 61/705,058 entitled "APPARATUS, SYSTEM, AND METHOD FOR SNAPSHOTS IN A STORAGE DEVICE" and filed on Sep. 24, 2012 for Nisha Talagala, et al. and of U.S. Provisional Patent Application No. 61/726,316 entitled "APPARATUS, SYSTEM, AND METHOD FOR SNAPSHOTS IN A STORAGE DEVICE" and filed on Nov. 14, 2012 for Nisha Talagala, et al., which are incorporated herein by reference.

TECHNICAL FIELD

The present disclosure, in various embodiments, relates to a time sequence for data and more particularly relates to an interface for time sequence requests.

BACKGROUND

In traditional storage and memory, the concepts of time based virtualization and address based virtualization have largely been separated. Typical storage and memory systems are accessed by address. When client applications wish to track time dependency, they may track a history of changes themselves, on top of the address based access.

Even if a storage or memory system may store data in a log, the systems still use the log to provide address based access. Client applications have little or no access to the underlying log of the storage or memory system, and still track a history of changes themselves using the provided address based access.

SUMMARY

Methods are presented for time sequence data management. A method, in one embodiment, includes writing data in a sequential log-structure. In a further embodiment, a method includes receiving a time sequence request from a client. A method, in another embodiment, includes servicing a time sequence request based on a temporal order of data in a sequential log structure.

Apparatuses are presented for data management. In one embodiment, a log storage module is configured to store data sequentially to an append point of a sequential, chronologically ordered writing structure. A temporal order module, in a further embodiment, is configured to preserve a chronological order of data in a sequential, chronologically ordered writing structure. In another embodiment, a time sequence interface module is configured to satisfy time sequence requests using a chronological order.

Systems are presented for time sequence data management. In one embodiment, a system includes a memory device configured to store a sequential, log-based writing structure. A system, in a further embodiment, includes a temporal order module configured to preserve a temporal order of data in a sequential, log-based writing structure in response to storage capacity recovery events for a memory device. In another embodiment, a system includes a time sequence interface module configured to provide access to data in a temporal order.

Computer program products are presented comprising a computer readable storage medium storing computer usable program code executable to perform operations for time sequence data management. In one embodiment, an operation includes marking a chronological period of data in a sequential journal with an era identifier. An operation, in another embodiment, includes preserving at least one version of data from a chronological period and an era identifier in a sequential journal in response to a storage capacity recovery event for the chronological period. In a further embodiment, an operation includes providing access to a snapshot of a chronological period of data using an era identifier.

Other apparatuses are presented for time sequence data management. An apparatus, in one embodiment, includes means for maintaining data in a sequential log writing structure. In a further embodiment, an apparatus includes means for preserving, in response to a storage capacity recovery event, an order in which data was written. In another embodiment, an apparatus includes means for accessing data based on an order in which data is written.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1A:
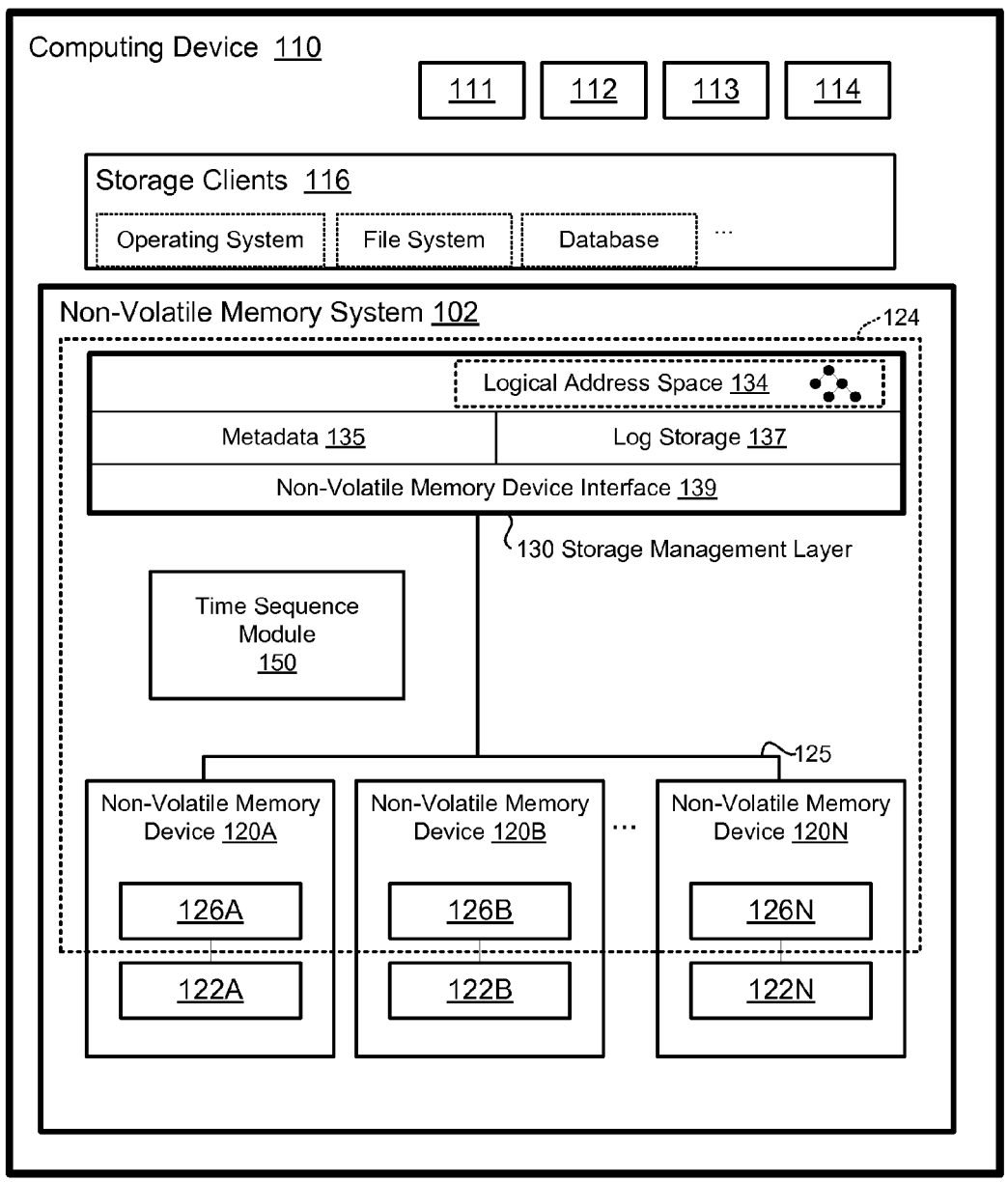
FIG. 1A is a schematic block diagram of one embodiment of a system for time sequence data management.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), phase change memory (PCM or PRAM), a portable compact disc read-only memory (CD-ROM), a digital versatile disc (DVD), a blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

According to various embodiments, a non-volatile memory controller manages one or more non-volatile memory devices. The non-volatile memory device(s) may comprise memory or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device). Memory units may include, but are not limited to: pages, memory divisions, erase blocks, sectors, blocks, collections or sets of physical storage locations (e.g., logical pages, logical erase blocks, described below), or the like.

The non-volatile memory controller may comprise a storage management layer ("SML"), which may present a logical address space to one or more storage clients. One example of an SML is the Virtual Storage Layer® of Fusion-io, Inc. of Salt Lake City, Utah. Alternatively, each non-volatile memory device may comprise a non-volatile memory media controller, which may present a logical address space to the storage clients. As used herein, a logical address space refers to a logical representation of memory resources. The logical address space may comprise a plurality (e.g., range) of logical addresses. As used herein, a logical address refers to any identifier for referencing a memory resource (e.g., data), including, but not limited to: a logical block address ("LBA"), cylinder/head/sector ("CHS") address, a filename, an object identifier, an inode, a Universally Unique Identifier ("UUID"), a Globally Unique Identifier ("GUID"), a hash code, a signature, an index entry, a range, an extent, or the like.

The SML may maintain metadata, such as a forward index or other mapping structure, to map logical addresses of the logical address space to media storage locations on the non-volatile memory device(s). The SML may provide for arbitrary, any-to-any mappings from logical addresses to physical storage resources. As used herein, an "any-to any" mapping may map any logical address to any physical storage resource. Accordingly, there may be no pre-defined and/or pre-set mappings between logical addresses and particular, media storage locations and/or media addresses. As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML may map logical addresses to physical data resources of any size and/or granularity, which may or may not correspond to the underlying data partitioning scheme of the non-volatile memory device(s). For example, in some embodiments, the non-volatile memory controller is configured to store data within logical memory units that are formed by logically combining a plurality of physical memory units, which may allow the non-volatile memory controller to support many different virtual memory unit sizes and/or granularities.

As used herein, a logical memory element refers to a set of two or more non-volatile memory elements that are or are capable of being managed in parallel (e.g., via an I/O and/or control bus). A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (each non-volatile memory element being accessible in parallel). As used herein, a logical memory division refers to a set of two or more physical memory divisions, each physical memory division on a respective non-volatile memory element in the respective logical memory element.

The logical address space presented by the storage management layer may have a logical capacity, which may correspond to the number of available logical addresses in the logical address space and the size (or granularity) of the data referenced by the logical addresses. For example, the logical capacity of a logical address space comprising $2^{32}$ unique logical addresses, each referencing 2048 bytes (2 KiB) of data may be $2^{43}$ bytes. (As used herein, a kibibyte (KiB) refers to 1024 bytes). In some embodiments, the logical address space may be thinly provisioned. As used herein, a "thinly provisioned" logical address space refers to a logical address space having a logical capacity that exceeds the physical capacity of the underlying non-volatile memory device(s). For example, the storage management layer may present a 64-bit logical address space to the storage clients (e.g., a logical address space referenced by 64-bit logical addresses), which exceeds the physical capacity of the underlying non-volatile memory devices. The large logical address space may allow storage clients to allocate and/or reference contiguous ranges of logical addresses, while reducing the chance of naming conflicts. The storage management layer may leverage the any-to-any mappings between logical addresses and physical storage resources to manage the logical address space independently of the underlying physical storage devices. For example, the storage management layer may add and/or remove physical storage resources seamlessly, as needed, and without changing the logical addresses used by the storage clients.

The non-volatile memory controller may be configured to store data in a contextual format. As used herein, a contextual format refers to a self-describing data format in which persistent contextual metadata is stored with the data on the physical storage media. The persistent contextual metadata provides context for the data it is stored with. In certain embodiments, the persistent contextual metadata uniquely identifies the data that the persistent contextual metadata is stored with. For example, the persistent contextual metadata may uniquely identify a sector of data owned by a storage client from other sectors of data owned by the storage client. In a further embodiment, the persistent contextual metadata identifies an operation that is performed on the data. In a further embodiment, the persistent contextual metadata identifies a sequence of operations performed on the data. In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data. The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory media, a memory division index, or the like).

In some embodiments, the contextual data format may allow data context to be determined (and/or reconstructed) based upon the contents of the non-volatile memory media, and independently of other metadata, such as the arbitrary, any-to-any mappings discussed above. Since the media location of data is independent of the logical address of the data, it may be inefficient (or impossible) to determine the context of data based solely upon the media location or media address of the data. Storing data in a contextual format on the non-volatile memory media may allow data context to be determined without reference to other metadata. For example, the contextual data format may allow the metadata to be reconstructed based only upon the contents of the non-volatile memory media (e.g., reconstruct the any-to-any mappings between logical addresses and media locations).

In some embodiments, the non-volatile memory controller may be configured to store data on one or more asymmetric, write-once media, such as solid-state storage media. As used herein, a "write once" storage medium refers to a storage medium that is reinitialized (e.g., erased) each time new data is written or programmed thereon. As used herein, an "asymmetric" storage medium refers to a storage medium having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media). The memory media may be partitioned into memory divisions that can be erased as a group (e.g., erase blocks) in order to, inter alia, account for the asymmetric properties of the media. As such, modifying a single data segment in-place may require erasing the entire erase block comprising the data, and rewriting the modified data to the erase block, along with the original, unchanged data. This may result in inefficient "write amplification," which may excessively wear the media. Therefore, in some embodiments, the non-volatile memory controller may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (the erasure latency is no longer part of the critical path of a write operation).

The non-volatile memory controller may comprise one or more processes that operate outside of the regular path for servicing of storage operations (the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client, identifying the logical addresses of the request, performing one or more storage operations on non-volatile memory media, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile memory controller comprises a groomer, which is configured to reclaim memory divisions (e.g., erase blocks) for reuse. The write out-of-place paradigm implemented by the non-volatile memory controller may result in obsolete or invalid data remaining on the non-volatile memory media. For example, overwriting data X with data Y may result in storing Y on a new memory division (rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory media may accumulate a significant amount of invalid data. A groomer process may operate outside of the critical path for servicing storage operations. The groomer process may reclaim memory divisions so that they can be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller may be further configured to store data in a sequential and/or chronologically ordered, log-based writing structure, journal, or the like. A sequential, log-based writing structure or other chronologically ordered and/or log-based format refers to a data format that defines an ordered sequence of storage operations performed on a non-volatile memory media. A journal, in certain embodiments, comprises a sequential and/or chronological record of data operations that may be used to reconstruct, reinstate, or revert to one or more historical or alternative versions of the data. In some embodiments, the log-based format comprises storing data in a pre-determined sequence of media addresses of the non-volatile memory media (e.g., within sequential pages and/or erase blocks of the media). The log-based format may further comprise associating data (e.g., each packet or data segment) with respective sequence indicators such as the epoch identifiers described below. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data.

In some embodiments a sequential, log-based writing structure may also be "append only." The non-volatile memory controller may maintain a current append point at a media address of the non-volatile memory device. The append point may be a current memory division and/or offset within a memory division. Data may then be sequentially appended from the append point. The sequential ordering of the data, therefore, may be determined based upon the sequence indicator of the memory division of the data in combination with the sequence of the data within the memory division. Upon reaching the end of a memory division, the non-volatile memory controller may identify the "next" available memory division (the next memory division that is initialized and ready to store data). The groomer may reclaim memory divisions comprising invalid, stale, and/or deleted data, to ensure that data may continue to be appended to the sequential, log-based writing structure.

The sequential, log-based writing structure described herein may allow valid data to be distinguished from invalid data based upon the contents of the non-volatile memory media, and independently of other metadata. As discussed above, invalid data may not be removed from the non-volatile memory media until the memory division comprising the data is reclaimed. Therefore, multiple "versions" of data having the same context may exist on the non-volatile memory media (e.g., multiple versions of data having the same logical addresses). The sequence indicators associated with the data may be used to distinguish invalid versions of data from the current, up-to-date version of the data; the data that is the most recent in the sequential, log-based writing structure is the current version, and previous versions may be identified as invalid.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description.

FIG. 1A depicts one embodiment of a system 100 comprising a time sequence module 150 for time sequence data management. The time sequence module 150 may be part of and/or in communication with a storage management layer (SML) 130. The SML 130 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 (and/or non-volatile memory controller 124) to a communication network, such as an Internet Protocol network, a Storage Area Network, or the like.

The computing device 110 may further comprise a non-transitory, computer readable storage media 114. The computer readable storage media 114 may comprise executable instructions configured to cause the computing device 110 (e.g., processor 111) to perform steps of one or more of the methods disclosed herein. Alternatively, or in addition, the storage management layer 130 and/or one or more modules thereof may be embodied as one or more computer readable instructions stored on the non-transitory storage media 114.

The storage management layer 130 may be configured to provide storage services to one or more storage clients 116. The storage clients 116 may include local storage clients 116 operating on the computing device 110 and/or remote, storage clients 116 accessible via the network (and network interface 113). The storage clients 116 may include, but are not limited to: operating systems, file systems, database applications, server applications, kernel-level processes, user-level processes, applications, and the like.

The storage management layer 130 comprises and/or is communicatively coupled to one or more non-volatile memory devices 120A-N. The non-volatile memory devices 120A-N may include different types of non-volatile memory devices including, but not limited to: solid-state storage devices, hard drives, SAN storage resources, or the like. While non-volatile memory devices 120A-N are described herein as an example, in other embodiments, the SML 130, the time sequence module 150, or the like may similarly manage and service time sequence requests for one or more volatile memory devices, such as random access memory ("RAM"), dynamic RAM ("DRAM"), static RAM ("SRAM"), or the like. Each reference to non-volatile memory herein, may similarly apply to volatile memory.

Figure 1B:
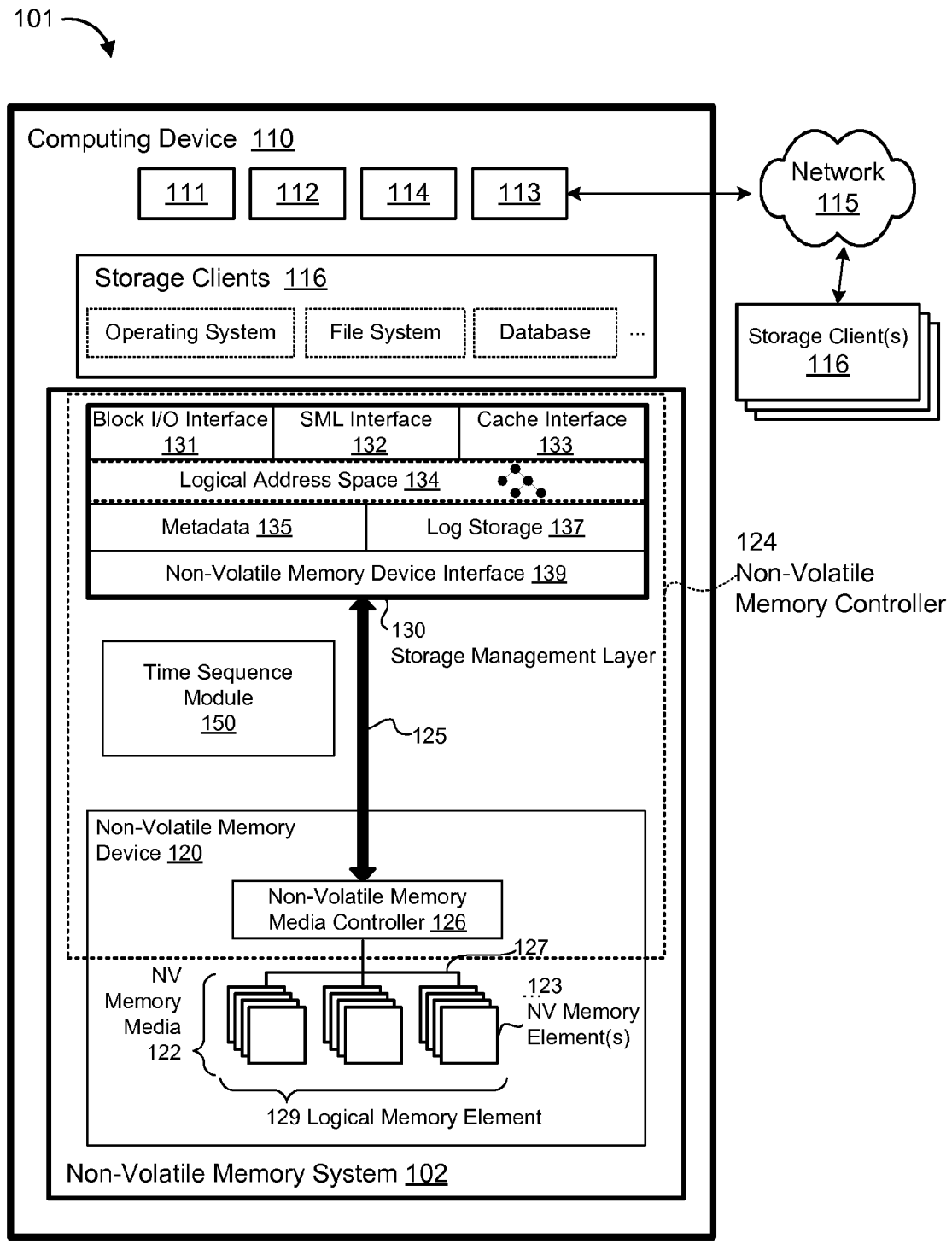
FIG. 1B is a schematic block diagram of another embodiment of a system for time sequence data management.

The non-volatile memory devices 120A-N may comprise respective non-volatile memory media controllers 126A-N and non-volatile memory media 122A-N. As illustrated in FIG. 1B, The SML 130 may provide access to the non-volatile memory devices 120A-N via a traditional block I/O interface 131. Additionally, the SML 130 may provide access to enhanced functionality (large, virtual address space, time sequence requests) through the SML interface 132. The metadata 135 may be used to manage and/or track storage operations performed through any of the Block I/O interface 131, SML interface 132, cache interface 133, or other, related interfaces.

The cache interface 133 may expose cache-specific features accessible via the storage management layer 130. Also, in some embodiments, the SML interface 132 presented to the storage clients 116 provides access to data transformations implemented by the non-volatile memory devices 120A-N and/or the non-volatile memory media controllers 126A-N.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations on one or more of the non-volatile memory devices 120A-N. The SML 130 may maintain metadata 135 comprising any-to-any mappings between logical addresses and media locations, as described above.

The SML 130 may further comprise a log storage module 137 that is configured to store data in a contextual, log-based format. The contextual, log-based format may comprise associating data with persistent contextual metadata, such as the logical address of the data, or the like. The contextual, log-based format may further comprise associating data with respective sequence identifiers on the non-volatile memory media 122A-N, which define an ordered sequence of storage operations performed on the non-volatile memory devices 120A-N, as described above.

The SML 130 may further comprise a non-volatile memory device interface 139 configured to transfer data, commands, and/or queries to the non-volatile memory devices 120A-N over a bus 125, which may include, but is not limited to: a peripheral component interconnect express ("PCI Express" or "PCIe") bus, a serial Advanced Technology Attachment ("ATA") bus, a parallel ATA bus, a small computer system interface ("SCSI"), FireWire, Fibre Channel, a Universal Serial Bus ("USB"), a PCIe Advanced Switching ("PCIe-AS") bus, a network, Infiniband, SCSI RDMA, or the like. The non-volatile memory device interface 139 may communicate with the non-volatile memory devices 120A-N using input-output control ("IO-CTL") command(s), IO-CTL command extension(s), remote direct memory access, or the like.

The non-volatile memory system 102, in the depicted embodiment, includes a time sequence module 150. The time sequence module 150, in certain embodiments, exposes time sequence information for data stored in a sequential, log-based writing structure to storage clients 116. For example, the time sequence module 150 may support one or more time sequence requests over an interface such as the SML interface 132 described below, providing access to historical snapshots of data, allowing storage clients 116 to rollback or iterate through versions of data, allowing storage clients 116 to manage snapshots or epochs of data, or otherwise providing access to data in a temporal and/or chronological order. In this manner, the SML 130, in cooperation with the time sequence module 150, may provide access to data in both a spatial or address order (e.g., using the block I/O interface 131 described below or the like) and in a historical or temporal order (e.g., using time sequence requests over the SML interface 132 or the like).

Time sequence information for data, as used herein, comprises information indicating or otherwise associated with a temporal order in which data was written to the non-volatile memory device 120. Storage clients 116, in various embodiments, may use time sequence information, or associated services the time sequence module 150 provides, to access multiple historical versions or snapshots of data, to rollback transactions or operations if they fail or the like, to asynchronously replicate data in a temporal order, or to perform other operations based on a temporal order of data. By providing access to temporal sequence information for data, using a temporal order for the data preserved in an underlying sequential, log-based writing structure that stores the data, in certain embodiments, the storage clients 116 may be relieved of the overhead and complication of maintaining time sequence information themselves.

In one embodiment, the time sequence module 150 may maintain time sequence information (e.g., a temporal order of data, a chronological order of data), as part of the data stored in the sequential, log-based writing structure itself, so that a separate copy or historical record does not need to be maintained. In a further embodiment, the time sequence module 150 may preserve a temporal order of data in the non-volatile memory device 120 across storage capacity recovery operations for the non-volatile memory device 120, during which data may be copied or moved forward to a new location, such as an append point, of the sequential, log-based writing structure. For example, in certain embodiments, the time sequence module 150 may associate temporal ranges, spans, eras, periods, and/or epochs of data with an epoch identifier, and preserve the association when data is copied forward on the sequential, log-based writing structure or the like.

In one embodiment, the time sequence module 150 may comprise executable software code, such as a device driver, SML 130, or the like, stored on the computer readable storage media 114 for execution on the processor 111. In another embodiment the time sequence module 150 may comprise logic hardware of one or more of the non-volatile memory devices 120A-N, such as a non-volatile memory media controller 126A-N, a non-volatile memory controller 124, a device controller, a field-programmable gate array ("FPGA") or other programmable logic, firmware for an FPGA or other programmable logic, microcode for execution on a microcontroller, an application-specific integrated circuit ("ASIC"), or the like. In a further embodiment, the time sequence module 150 may include a combination of both executable software code and logic hardware.

In one embodiment, the time sequence module 150 is configured to receive storage requests from the SML 130 via a bus 125 or the like. The time sequence module 150 may be further configured to transfer data to/from the SML 130 and/or storage clients 116 via the bus 125. Accordingly, the time sequence module 150, in some embodiments, may comprise and/or be in communication with one or more direct memory access ("DMA") modules, remote DMA modules, bus controllers, bridges, buffers, and so on to facilitate the transfer of storage requests and associated data. In another embodiment, the time sequence module 150 may receive storage requests as an API call from a storage client 116, as an IO-CTL command, or the like. The time sequence module 150 is described in greater detail below with regard to FIGS. 3 and 4.

FIG. 1B is a block diagram of another embodiment of a system 101 comprising a time sequence module 150. As described above, the time sequence module 150 may be part of and/or in communication with a storage management layer 130. The SML 130 may operate on a non-volatile memory system 102 of a computing device 110, which, as discussed above, may comprise a processor 111, volatile memory 112, communication interface 113, and non-transitory, computer readable storage media 114. The communication interface 113 may comprise one or more network interfaces configured to communicatively couple the computing device 110 (and/or non-volatile memory controller 124) to a network 115 and/or to one or more remote, network-accessible storage clients 116.

The computing device 110 may comprise a non-volatile memory controller 124 that is configured to provide storage services to the storage clients 116. The storage clients 116 may include local storage clients 116 operating on the computing device 110 and/or remote, storage clients 116 accessible via the network 115 (and network interface 113). The non-volatile memory controller 124 comprises one or more non-volatile memory devices 120. Although FIG. 1B depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory ("nano RAM or NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM or PCM"), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, and the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on (and read data from) the non-volatile memory media 122 in the contextual, log-based format (e.g., a sequential, log-based writing structure) described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (a page of each element of non-volatile memory media 122).

The non-volatile memory controller 124 may comprise a SML 130 and the non-volatile memory media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 102.

As described above, the SML 130 may present a logical address space 134 to the storage clients 116 (through the interfaces 131, 132, and/or 133). The SML 130 may maintain metadata 135 comprising any-to-any mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks.

The non-volatile memory system 102 may further comprise a log storage module 137, which, as described above, may be configured to store data on the non-volatile memory device 120 in a contextual, log-based format. The contextual, log-based data format may comprise associating data with a logical address on the non-volatile memory media 122. The contextual, log-based format may further comprise associating data with respective sequence identifiers on the non-volatile memory media 122, which define an ordered sequence of storage operations performed on the non-volatile memory media 122, as described above. The non-volatile memory controller 124 may further comprise a non-volatile memory device interface 139 that is configured to transfer data, commands, and/or queries to the non-volatile memory media controller 126 over a bus 125, as described above.

Figure 2:
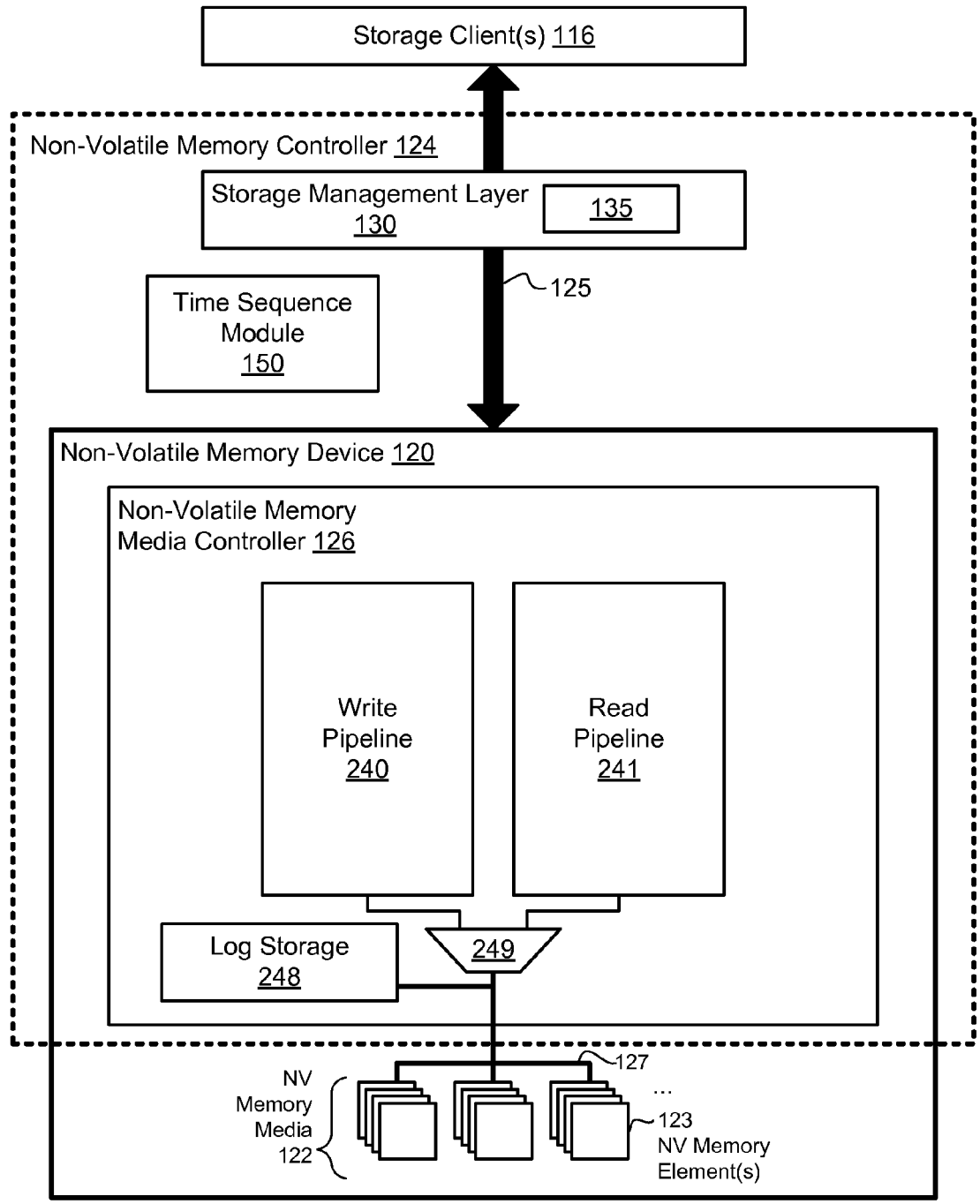
FIG. 2 is a schematic block diagram of another embodiment of a system for time sequence data management.

FIG. 2 depicts another embodiment of a non-volatile memory controller 124 for time sequence data management. The non-volatile memory device 120 may comprise a non-volatile memory media controller 126 and non-volatile memory media 122. The non-volatile memory media 122 may comprise a plurality of non-volatile memory elements 123, which may be communicatively coupled to the non-volatile memory media controller 126 via a bus 127, as described above.

The non-volatile memory media controller 126 may comprise a write pipeline 240 that is configured to store data on the non-volatile memory media 122 in a contextual format in response to requests received via the time sequence module 150. The requests may include and/or reference data to be stored on the non-volatile memory media 122, may include logical address(es) of the data, and so on. As described above, the contextual format may comprise storing a logical address of the data in association with the data on the non-volatile memory media 122. For example, the write pipeline 240 may be configured to format data into packets, and may include the logical address of the data in a packet header (or other packet field). The write pipeline 240 may be configured to buffer data for storage on the non-volatile memory media 122. In some embodiments, the write pipeline 240 may comprise one or more synchronization buffers to synchronize a clock domain of the non-volatile memory media controller 126 with a clock domain of the non-volatile memory media 122 (and/or bus 127).

The log storage module 248 may be configured to select media location(s) for the data and may provide addressing and/or control information to the non-volatile memory elements 123 via the bus 127. In some embodiments, the log storage module 248 is configured to store data sequentially in a log-based format within the non-volatile memory media. The log storage module 248 may be further configured to groom the non-volatile memory media, as described above. In certain embodiments the log storage module 248 is substantially similar to the log storage module 137 as described above. The log storage module 248 may be executed by the SML 130 and/or by the non-volatile memory media controller 126.

Upon writing data to the non-volatile memory media, the non-volatile memory media controller 126 may be configured to update metadata 135 (e.g., a forward index) to associate the logical address(es) of the data with the media address(es) of the data on the non-volatile memory media 122. In some embodiments, the metadata 135 may be maintained on the non-volatile memory media controller 126; for example, the metadata 135 may be stored on the non-volatile memory media 122, on a volatile memory (not shown), or the like. Alternatively, or in addition, the metadata 135 may be maintained within the SML 130 (e.g., on a volatile memory 112 of the computing device 110 of FIGS. 1A and 1B). In some embodiments, the metadata 135 may be maintained in a volatile memory by the SML 130, and may be periodically stored on the non-volatile memory media 122.

The non-volatile memory media controller 126 may further comprise a read pipeline 241 that is configured to read contextual data from the non-volatile memory media 122 in response to requests received via the request module 250. The requests may comprise a logical address of the requested data, a media address of the requested data, and so on. The read pipeline 241 may be configured to read data stored in a contextual format from the non-volatile memory media 122 and to provide the data to the SML 130 and/or a storage client 116. The read pipeline 241 may be configured to determine the media address of the data using a logical address of the data and the metadata 135. Alternatively, or in addition, the SML 130 may determine the media address of the data and may include the media address in the request. The log storage module 248 may provide the media address to the non-volatile memory elements 123, and the data may stream into the read pipeline 241 via a buffer. The read pipeline 241 may comprise one or more read synchronization buffers for clock domain synchronization, as described above.

The non-volatile memory media controller 126 may further comprise a multiplexer 249 that is configured to selectively route data and/or commands to/from the write pipeline 240 and the read pipeline 241. In some embodiments, non-volatile memory media controller 126 may be configured to read data while filling a buffer of the write pipeline 240 and/or may interleave one or more storage operations on one or more banks of non-volatile memory elements 123 (not shown).

Figure 3:
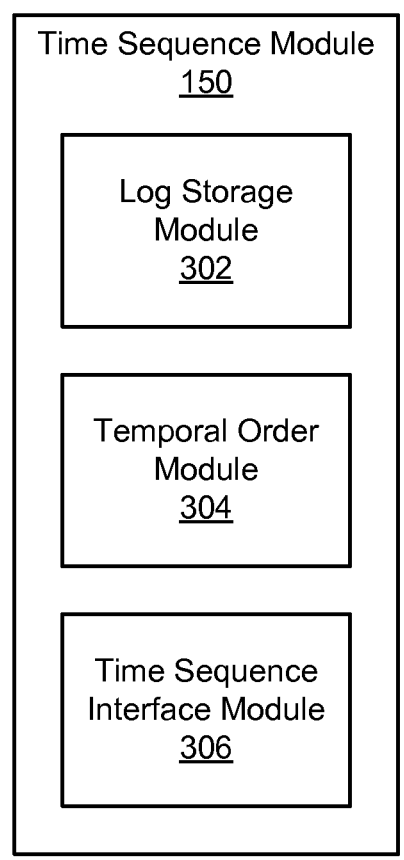
FIG. 3 is a schematic block diagram illustrating one embodiment of a time sequence module.

FIG. 3 depicts one embodiment of a time sequence module 150. The time sequence module 150 may be substantially similar to the time sequence module 150 described above with regard to FIGS. 1A, 1B, and 2. In general, as described above, the time sequence module 150 preserves time sequence information for data in a sequential, log-based writing structure to service time sequence requests for storage clients 116. In the depicted embodiment, the time sequence module 150 includes a log storage module 302, a temporal order module 304, and a time sequence interface module 306.

One or more of the log storage module 302, the temporal order module 304, and the time sequence interface module 306, in certain embodiments, may comprise executable code executing on the host computing device 110. For example, the log storage module 302, the temporal order module 304, and/or the time sequence interface module 306 may be part of a device driver for the non-volatile memory device 120, such as the SML 130 or the like. In a further embodiment, at least a portion of the log storage module 302, the temporal order module 304, and/or the time sequence interface module 306 may be part of the non-volatile memory media controller 126, as hardware logic circuits, FPGA firmware, microcode, or the like.

In one embodiment, the log storage module 302 stores data in a sequential, log-based writing structure. The log storage module 302, in certain embodiments, may be substantially similar to the log storage module 137 of FIGS. 1A and 1B and/or the log storage module 248 of FIG. 2. As described above, the log storage module 302 may sequentially write data to an append point of a sequential, log-based writing structure preserved in the non-volatile memory media 122. The log storage module 302 may write data to the sequential, log-based writing structure in a temporal order in which the data is received from storage clients 116, in association with write requests or the like.

The log storage module 302, in certain embodiments, may write data sequentially within storage regions of the non-volatile memory media 122, such as logical or physical erase blocks, logical or physical pages, chips, dies, die planes, and/or other storage regions. In embodiments where the storage regions do not have a natural or predetermined order or sequence, the log storage module 302 may determine a sequentially ordered list of storage regions to maintain or track the order in which the storage regions are used in the sequential, log-based writing structure, thereby preserving the temporal order of data across different storage regions. One example of a sequential, log-based writing structure comprising an ordered set of erase blocks is described below with regard to FIG. 5.

While the log storage module 302 writes data sequentially to a sequential, log-based writing structure, in certain embodiments, maintenance operations, such as a storage capacity recovery operation or the like, may interfere with the sequential order, causing certain data to become out of order. In one embodiment, the temporal order module 304 preserves a temporal order of the data in the sequential, log-based writing structure, even in the presence of interfering maintenance operations or the like. One embodiment of a storage capacity recovery module 402 is described below with regard to FIG. 4. In general, the storage capacity recovery module 402 recovers storage capacity of the sequential, log-based writing structure by copying certain data from a selected storage region (e.g., a logical or physical erase block) forward to an append point of the sequential, log-based writing structure to preserve the data and erasing the selected storage region so that the selected storage region may be reused to store different data.

The temporal order module 304, in certain embodiments, marks or labels data in the sequential, log-based writing structure with sequence information, such as an epoch identifier, a span identifier, an era identifier, or the like that indicates a temporal and/or chronological order for data, even if the data is copied forward to an append point or other new location in the sequential, log-based writing structure. An epoch identifier, as used herein, comprises an indicator, marker, label, flag, field, packet, or other data structure identifying or preserving a temporal and/or sequential order for data in a sequential, log-based writing structure.

An epoch identifier may be absolute (e.g., a timestamp), relative (e.g., a sequence number), or may otherwise indicate a temporal and/or sequential order for data. The temporal order module 304, in one embodiment, may insert an epoch identifier into individual data segments, such as packets, error correcting code ("ECC") chunks or blocks, logical pages, physical pages, logical erase blocks, physical erase blocks, LBA data block or range of data blocks, files, data objects, or another predefined segment of data. For example, in one embodiment, the write pipeline 240 may packetize data into discrete data packets and each data packet may include a metadata header, into which the temporal order module 304 may insert an epoch identifier for the data packet as the write pipeline 240 and/or the log storage module 302 processes the data packets and writes them to the sequential, log-based writing structure.

The temporal order module 304, in one embodiment, may use a different epoch identifier for different data segments, incrementing the epoch identifiers between data segments or the like. In a further embodiment, the temporal order module 304 may mark or label a plurality of data segments with the same epoch identifier. For example, the temporal order module 304 may associate a temporal range, span, era, period, and/or epoch of data (e.g., data received and/or written within the same period of time) with a single epoch identifier. The temporal order module 304, in one embodiment, may insert copies of the single epoch identifier into metadata for each data segment associated with the temporal range. For example, the temporal order module 304 may store an epoch identifier in metadata packet headers for packets in the temporal range associated with the epoch identifier.

In another embodiment, the temporal order module 304 may mark or label an entire temporal range of data with an epoch identifier, without storing copies of the epoch identifier with each individual data segment within the temporal range. For example, the temporal order module 304 may store an epoch identifier at a beginning, end, and/or another predefined location within a temporal range of data. In one embodiment, the temporal order module 304 may store an epoch identifier or marker at the beginning of each new temporal range of data or epoch, so that the data between epoch identifiers is associated with the beginning epoch identifier. The temporal order module 304, in certain embodiments, may mark both the beginning and the end of a temporal range with the same epoch identifier. In a further embodiment, the temporal order module 304 may use a beginning epoch identifier of a next temporal range as an end marker for a previous temporal range, or the like.

The temporal order module 304, in one embodiment, marks a temporal range with an epoch identifier in a dedicated epoch metadata packet or the like, writing an epoch metadata packet to an append point of the sequential, log-based writing structure at the beginning and/or ending of a temporal range of data. In a further embodiment, the temporal order module 304 may insert a beginning and/or ending epoch identifier into metadata for a data segment, such as a metadata header or the like, associated with workload data of a storage client 116, or the like, without a dedicated epoch metadata packet. For example, the temporal order module 304 may store an epoch identifier in a packet header at the beginning of a temporal range, a packet header at the end of a temporal range, or the like. In certain embodiments, using an epoch identifier to mark the beginning and/or end of a temporal range may be more efficient than marking each data segment in the temporal range with an epoch identifier.

The temporal order module 304, in certain embodiments, increments an epoch identifier for association with each subsequent temporal range of data in the sequential, log-based writing structure. For example, the temporal order module 304, in one embodiment, may increment an epoch identifier in response to a new epoch request from a storage client 116, and may mark a subsequent temporal range of data with the incremented epoch identifier. In other embodiments, the temporal order module 304 may increment an epoch identifier automatically and/or periodically in response to a predetermined amount of time elapsing (e.g., a timer), a storage request, a write request invalidating data, and/or another epoch trigger. Incrementing an epoch identifier, in various embodiments, may comprise updating the epoch identifier to a current timestamp, adding a predetermined value to the epoch identifier, performing a predetermined transform on the epoch identifier, or otherwise changing a value of a current epoch identifier for use as a subsequent epoch identifier. In certain embodiments, each epoch identifier may be unique. In a further embodiment, the temporal order module 304 may reuse an epoch identifier in response to expiring a temporal range or epoch associated with the epoch identifier, so that a set of currently used epoch identifiers remains unique.

The temporal order module 304, in one embodiment, preserves a temporal and/or sequential order of data across a maintenance operation, such as a storage capacity recovery event, which copies, moves, or otherwise changes an order of data in a sequential, log-based writing structure, by ensuring that temporal ranges of data remain associated with their respective epoch identifiers. In certain embodiments, the temporal order module 304 may copy one or more epoch identifiers forward to an append point of a sequential, log-based writing structure as part of a storage capacity recovery event or the like, so that the associated data remains associated with the epoch identifiers in the sequential, log-based writing structure. By preserving a temporal, sequential, and/or chronological order of data, in certain embodiment, the temporal order module 304 may thereby preserve a series of one or more snapshots or clones of data at different points in time, as described below with regard to the time sequence interface module 306.

For example, if the temporal order module 304 stores epoch identifiers in metadata headers of data packets, the temporal order module 304 may ensure that the epoch identifiers remain in the metadata headers as the data packets are copied or written forward on the sequential, log-based writing structure. In a further embodiment, the temporal order module 304 may copy or write data forward an entire temporal range of data at a time, so that the temporal range of data remains co-located in the sequential, log-based writing structure. For example, the temporal order module 304 may copy a beginning and/or end epoch identifier forward on the sequential, log-based writing structure together with the temporal range of data.

The temporal order module 304, in certain embodiments, may ensure that temporal ranges or epochs remain separate, by cooperating with the storage capacity recovery module 402 to copy or write data of a temporal range forward to a separate append point of the sequential, log-based writing structure than an intake append point. For example, as data is received from storage clients 116, the log storage module 302 may write the data to an intake append point of a sequential, log-based writing structure and the storage capacity recovery module 402 may copy or write data forward to a separate append point of the sequential, log-based writing structure during a storage capacity recovery operation, so that the data does not become mixed, and temporal ranges of data remain together. Different append points of a sequential, log-based writing structure may comprise separate write pipelines 240, separate buffers or queues, separate logs within the log-based writing structure, or the like such that data written to the different append points is separated, allowing different temporal ranges or epochs to remain together.

In another embodiment, the temporal order module 304 may allow a temporal range of data or epoch to become separated or disjoint within a sequential, log-based writing structure, while preserving the temporal and/or sequential order of the data using epoch identifiers or the like. The temporal order module 304, in certain embodiments, may scan the sequential, log-based writing structure to locate epoch identifiers associating data with a temporal range or epoch.

In a further embodiment, the temporal order module 304 may maintain one or more data structures mapping or tracking locations of data for temporal ranges or epochs of data. For example, in one embodiment, the temporal order module 304 may maintain a logical-to-physical mapping structure for each temporal range or epoch, mapping logical addresses of a temporal range or epoch to the physical locations of the data in the sequential, log-based writing structure of the non-volatile memory media 122. In a further embodiment, where temporal ranges or epochs are contiguous within a sequential, log-based writing structure, the temporal order module 304 may maintain a single logical-to-physical mapping structure that maps epoch identifiers to the contiguous location of the associated temporal ranges or epochs in the non-volatile memory media 122.

In embodiments where the temporal order module 304 maintains one or more mapping structures for temporal ranges or epochs, the temporal order module 304 may rebuild or reconstruct a lost or damaged mapping structure by scanning the sequential, log-based writing structure to locate epoch identifiers, and may create mappings between the epoch identifiers (or associated logical addresses) and the physical locations in the non-volatile memory media 122. Reconstructing mappings for temporal ranges of data or epochs is described in greater detail below with regard to the reconstruction module 404 of FIG. 4. Because the temporal and/or sequential order of data is preserved in the sequential, log-based writing structure, the temporal order module 304, in certain embodiments, may reconstruct temporal metadata or mappings based on data stored in the sequential, log-based writing structure should the non-volatile memory device 120 experience a power failure or other restart event, thereby ensuring that the temporal and/or sequential order of data is persistent.

In one embodiment, data from a previous temporal range may be invalidated by new or updated data written to the same logical address or logical address range as the data. In certain embodiments, the temporal order module 304 may preserve invalid data so that the invalid data is not erased during a storage capacity recovery operation and so that the time sequence interface module 306 may provide access to the previous temporal range of data even after some or all of the data has been invalidated. The temporal order module 304, in one embodiment, retains or preserves each version of data in a temporal range or epoch, as different snapshots, clones, or the like, so that multiple versions, snapshots, and/or clones of data for the same logical address are retained and are accessible in the same temporal range or epoch. For example, if a storage client 116 writes one version of a file to the non-volatile memory device 120 and writes a different version of the file within the same temporal range or epoch (e.g., before the temporal order module 304 has incremented an epoch identifier), the temporal order module 304 may retain both versions of the file, so that the time sequence interface module 306 may provide the storage client 116 with access to both versions.

In a further embodiment, instead of retaining or preserving multiple versions, snapshots, and/or clones of the same data within the same temporal range or epoch, the temporal order module 304 may retain a single version, snapshot, and/or clone, such as a most recent version of data, an oldest version of data, or the like, for each temporal range or epoch, and allow older, invalid versions of data in each temporal range to be erased during a storage capacity recovery operation or the like. For example, the temporal order module 304 may cooperate with the storage capacity recovery module 402 to copy a most recent version of data, or another version, in a temporal range or epoch forward on a sequential, log-based writing structure, while allowing the storage capacity recovery module 402 to erase, delete, trim, or otherwise clear older versions of the data from the non-volatile memory device 120 during a storage capacity recovery operation.

In embodiments where the temporal order module 304 retains just a subset of one or more versions, snapshots, or clones of data, such as a most recent version of data or the like, for each temporal range or epoch, the time sequence interface module 306 may provide a storage client 116 with access to one or more versions, views, clones, or snapshots of data from a temporal range, without the overhead of storing multiple versions of data for each temporal range. The number of changes or versions of data that the temporal order module 304 retains per temporal range or epoch of data may vary on a per temporal range basis. For example, in one embodiment, the number of retained changes or versions may be selected by a storage client 116 in a new epoch request or the like. In another embodiment, the temporal order module 304 may store all changes or operations for a most recent set of one or more temporal ranges or epochs, and may retain just a most recent version of data for temporal ranges or epochs older than the most recent set.

In order for the time sequence interface module 306 to provide access to different versions, snapshots, and/or clones of data, as described below, in certain embodiments, the temporal order module 304 may be configured to preserve one or more validity maps, logical-to-physical mapping structures, or the like for different versions, snapshots, and/or clones of data. A validity bitmap, or other validity data structure, in certain embodiments, indicates the validity of a block or other data segment with respect to the non-volatile memory device 120. In embodiments with multiple versions, snapshots, epochs, and/or clones of data, a block or segment of data that is valid with respect to one snapshot may have been overwritten and may be invalid with respect to another snapshot.

The temporal order module 304, in certain embodiments, may maintain validity metadata, such as validity bitmaps or the like, for one or more different epochs, snapshots, clones, or the like of data. For a temporal range of data written during the course of an epoch, the non-volatile memory controller 124, the non-volatile memory media controller 126, the SML 130, or the like may modify and maintain validity metadata, logical-to-physical mappings, or other metadata as part of the metadata 135 as described above. In response to initializing or creating a new epoch, snapshot, clone or the like, in one embodiment, a state of the validity bitmap or other validity metadata may correspond to a current state of the non-volatile memory device 120 and the temporal order module 304 may preserve the validity bitmap or other validity metadata, such that the time sequence interface module 306 may determine which data is valid in the previous epoch, snapshot, clone, or the like.

The temporal order module 304 may modify a validity bitmap or other validity metadata and/or a logical-to-physical mapping structure for an epoch, snapshot, clone or the like in response to the storage capacity recovery module 402 moving or copying data as part of a storage capacity recovery operation, in response to a write request modifying data of an epoch, snapshot, or clone, or in response to another data update event. The non-volatile memory controller 124, the non-volatile memory media controller 126, the SML 130, or the like, in one embodiment, may cause a new epoch, snapshot, or clone to inherit the validity bitmap or other validity metadata and/or a logical-to-physical mapping from a previous epoch, snapshot, or clone. The non-volatile memory controller 124, the non-volatile memory media controller 126, the SML 130 or the like may modify and update the inherited validity bitmap or other validity metadata and/or a logical-to-physical mapping structure for the new epoch, snapshot, or clone in response to write requests invalidating previous data, storage capacity recovery operations, or the like.

In one embodiment, the temporal order module 304 copies a validity bitmap or other validity metadata and/or a logical-to-physical mapping structure for an epoch, snapshot, or clone at creation time of the epoch, snapshot, or clone. In a further embodiment, instead of copying an entire validity bitmap or other validity metadata and/or logical-to-physical mapping structure at creation time, the temporal order module 304 may maintain the changes, deltas, or differences between chronologically adjacent epochs, snapshots, and/or clones, or may otherwise maintain partial validity metadata and/or logical-to-physical mappings. In one embodiment, the temporal order module 304 may rely on or use a sequential order of data in the sequential, log-based writing structure to maintain a temporal, chronological, and/or sequential order of data until data is moved by a storage capacity recovery operation of the storage capacity recovery module 402 or the like, as data belonging to the same epoch, snapshot, or clone may be contiguous and/or collocated prior to the storage capacity recovery operation. The temporal order module 304 may copy one or more validity bitmap entries or other validity metadata and/or logical-to-physical mappings for data of a snapshot, epoch, or clone opportunistically, automatically, and/or on-demand in response to data being copied, moved, or otherwise becoming out of order, a policy referred to herein as a copy-on-write policy.

The temporal order module 304, in various embodiments, may mark validity metadata and/or logical-to-physical mappings for certain data (e.g., logical blocks or sectors, logical or physical pages, ECC chunks, or the like) associated with a snapshot, epoch, or clone as copy-on-write, may mark all data as copy-on-write, or the like. In response to an attempt to modify validity metadata and/or a logical-to-physical mapping marked copy-on-write, the temporal order module 304 may create a copy and link the copy to the snapshot, epoch, or clone associated with the copy. In one embodiment, the validity metadata or validity bitmap and/or logical-to-physical mappings that the temporal order module 304 copies may be read-only (until reclamation or the like) and may be destaged to the sequential, log-based writing structure of the non-volatile memory device 120, or the like.

In certain embodiments, the temporal order module 304 may use a copy-on-write policy, substantially as described above, to maintain multiple snapshots for one or more epochs or other temporal ranges of data. In response to a write request updating or changing existing data stored in the non-volatile memory device 120, the temporal order module 304 may store just the changes or deltas to the data to an append point of the sequential, log-based writing structure. Storing just the changes or deltas to data, in one embodiment, may efficiently use storage capacity of the non-volatile memory media 122, limiting the amount of redundant data stored in the non-volatile memory device 120. The time sequence interface module 306, in response to a snapshot request as described below, may combine deltas, changes, and/or original data from multiple points in time (e.g., one or more epochs or other temporal ranges) to construct a snapshot in a copy-on-write environment.

In one embodiment, the time sequence interface module 306 receives, services, executes, fulfills, and/or otherwise satisfies time sequence requests from storage clients 116, using the temporal and/or sequential order of data preserved in the sequential, log-based writing structure by the temporal order module 304. A time sequence request, as used herein, comprises a command, function call, message, or other request associated with or which may be satisfied using a temporal and/or sequential order of data. A time sequence request, in various embodiments, may include a snapshot request, a delta clone request, a rollback request, an iterate request, an asynchronous replication request, a new epoch request, a delete epoch request, a delete all request, an enumerate request, a report total request, a set epoch interval request, a new snapshot request, a delete snapshot request, or the like as described below. The time sequence interface module 306, in various embodiments, may directly or indirectly receive a time sequence request over an API, using a shared library, over a block I/O interface 131, over an SML interface 132, over another interface, from another module or device, and/or in another manner.

The time sequence interface module 306, in one embodiment, services a snapshot request by providing a snapshot of data from a different point in time to the requesting storage client 116 based on the preserved temporal order of data in the sequential, log-based writing structure. A snapshot, as used herein, comprises a representation of data in the non-volatile storage device 120, or a portion thereof, at a particular point in time. Storage clients 116 may use a snapshot as a backup, as an audit trail for regulatory compliance or the like, for asynchronous replication of data at a separate location, to isolate operations to a copy of data rendering the operation transactional, or the like.

The time sequence interface module 306, in certain embodiments, provides a storage client 116 with access to a snapshot of data. For example, the time sequence interface module 306 may provide both read and write access to a snapshot of data in substantially the same manner as the current or newest version of data. By providing write access to a snapshot of a previous version of data, the time sequence interface module 306 may allow a storage client 116 to isolate certain changes or operations to a snapshot, ensuring that the most recent or newest version of the data is not affected.

In one embodiment, each temporal range or epoch preserved by the temporal order module 304 may be associated with a different snapshot. As described above, in certain embodiments, the temporal order module 304 may preserve just the most recent version of data in a temporal range or epoch. The time sequence interface module 306, in one embodiment, may provide the most recent version of data from a temporal range or epoch as a snapshot.

In one embodiment, the time sequence interface module 306 may provide access to a snapshot of data at a block layer, using a block I/O interface 131 or the like, so that storage clients 116 may access data of a snapshot by LBA. In another embodiment, the time sequence interface module 306 may provide access to a snapshot of data at a file system layer, using the SML interface 132 or the like, so that storage clients 116 may access data of a snapshot by filename or other file identifier. In a further embodiment, the time sequence interface module 306 may provide access to a snapshot of data using another persistent namespace. The time sequence interface module 306, in various embodiments, may provide a storage client 116 with access to one or more snapshots as a hidden or invisible subdirectory, files with appended tags or timestamps, over an API, using a shared library, over a block I/O interface 131, over an SML interface 132, or using another interface.

A snapshot request may include an epoch identifier indicating which snapshot the storage client 116 is requesting.

The time sequence interface module 306, in certain embodiments, may continue to provide access to a requested snapshot until the time sequence interface module 306 receives a subsequent snapshot request with a different epoch identifier. In a further embodiment, each storage request, each time sequence request, or the like may include an epoch identifier for a snapshot, allowing the time sequence interface module 306 to dynamically provide access to different snapshots.

To determine the state of data in a snapshot, in one embodiment, the time sequence interface module 306 may iterate through the sequential, log-based writing structure from the oldest data toward the newest data, replaying a sequence of changes to the data, to determine the state of data in a snapshot, to determine a logical-to-physical mapping for a snapshot, or the like based on stored epoch identifiers. In a further embodiment, the time sequence interface module 306 may rollback a series of changes to data in the sequential, log-based writing structure from the newest data toward the oldest data, undoing a sequence of changes to the data, to determine the state of data in a snapshot, to determine a logical-to-physical mapping for a snapshot, or the like based on stored epoch identifiers.

In another embodiment, as described above, the temporal order module 304 may maintain one or more data structures mapping or tracking locations of data for temporal ranges or epochs of data, so that the time sequence interface module 306 may provide access to a snapshot of a particular temporal range or epoch without iterating through and/or rolling back changes in a sequential, log-based writing structure. For example, the temporal order module 304 may maintain a logical-to-physical mapping structure for each snapshot, mapping logical addresses of a snapshot to the physical locations of the data in the sequential, log-based writing structure of the non-volatile memory media 122, may maintain a single logical-to-physical mapping structure that maps epoch identifiers for different snapshots to the locations of the associated temporal ranges or epochs in the non-volatile memory media 122, or the like which the time sequence interface module 306 may provide access to a snapshot of a particular temporal range or epoch of data.

In certain embodiments, to activate a snapshot in response to a snapshot request or the like, the time sequence interface module 306 may validate or otherwise determine whether the requested snapshot exists. The temporal order module 304 may maintain a snapshot tree or other snapshot tracking data structure that indexes and/or tracks which snapshots exist, associates snapshots with temporal metadata such as an epoch identifier, validity metadata such as validity bitmaps, logical-to-physical mappings, or the like. In a further embodiment, the time sequence interface module 306 may write a snapshot-activate note or other snapshot-activation indicator to the sequential, log-based writing structure of the non-volatile memory device 120, indicating to the reconstruction module 404 described below which snapshot is currently active in response to the reconstruction module 404 reconstruct a logical-to-physical mapping structure in response to a power failure, an improper shutdown, or another restart event, during a startup process for the non-volatile memory device 120 or the like, so that the reconstruction module 404 may reconstruct the logical-to-physical mapping structure associated with the active snapshot, epoch, and/or clone.

In one embodiment, in response to a snapshot request or the like, the time sequence interface module 306 may increment an epoch identifier or epoch counter to create a new epoch, which inherits data from the activated snapshot.

The time sequence interface module 306, in cooperation with the reconstruction module 404, based on a snapshot-tree or other snapshot metadata, or the like may reconstruct, retrieve, or otherwise determine a validity bitmap or other validity metadata and/or a logical-to-physical mapping for the activated snapshot. The time sequence interface module 306 may provide read and/or write access to an activated snapshot. In response to a snapshot deactivation request, a snapshot request to activate a different snapshot, or the like, the time sequence interface module 306 may deactivate an activated snapshot by writing a snapshot-deactivation note or other snapshot-deactivation indicator to the sequential, log-based writing structure of the non-volatile memory device 120 or the like, so that the deactivation is persistent.

In one embodiment, in response to a delta clone request (e.g., a delta request, a clone request, a difference request, a data changes request, or the like) the time sequence interface module 306 may provide a requesting storage client 116 with access to changes in data of the non-volatile memory device 120 between points in time based on a temporal order preserved by the temporal order module 304. A delta clone, as used herein, comprises a representation of one or more differences, changes, or deltas for data (e.g., a data segment, storage region, LBA, LBA range, or the like) between different points in time. For example, the time sequence interface module 306, in response to a delta clone request, may provide one or more changes or deltas between different temporal ranges or epochs, between snapshots, between two identified points in time, or the like. A delta clone request, in one embodiment, may include indicators of the points in time between which the requesting storage client 116 is requesting changes.

The time sequence interface module 306, in one embodiment, may provide changes to a storage client 116 as a data structure, such as a linked-list, a table, a set, or the like with multiple changes. In another embodiment, the time sequence interface module 306 may allow a storage client 116 to iterate through individual changes, using a series of iterator commands (e.g., forward and back, previous and next, or the like). In one embodiment, the time sequence interface module 306 may provide changes or deltas in data to a storage client 116 in a temporal and/or sequential order in which the changes were made. In a further embodiment, the time sequence interface module 306 may provide changes or deltas in data to a storage client 116 in a logical address order, or the like (e.g., numerical order, alphabetical order). In certain embodiments, the time sequence interface module 306 may provide access to changes or deltas in data in both a temporal/sequential order and a logical address order, allowing storage clients 116 to request the order in which the time sequence interface module 306 provides the changes.

The time sequence interface module 306, in one embodiment, services rollback requests from storage clients 116 by providing access to a previous state of the data in the non-volatile memory device 120 (e.g., adjacent in time to a current state) based on the temporal order of the data preserved by the temporal order module 304 in the sequential, log-based writing structure. In certain embodiments, the rollback to a previous state may be permanent and the time sequence interface module 306 may invalidate, remove, trim, delete, erase, or otherwise clear data written after the rollback state from the non-volatile storage device 120. In other embodiments, the rollback to a previous state may be temporary and the time sequence interface module 306 may provide access to a subsequent state (e.g., adjacent in time to the previous state) in response to an iterate request or the like. A rollback request undoes or bypasses one or more changes in data, providing access to a previous state of the data, while an iterate request redoes one or more changes or otherwise returns data to a subsequent state based on the temporal order of the data preserved by the temporal order module 304 in the sequential, log-based writing structure.

In one embodiment, the time sequence interface module 306 may rollback and/or iterate forward at a single change granularity, changing the state of data a single change at a time. In a further embodiment, the time sequence interface module 306 may rollback and/or iterate forward at a temporal range or epoch granularity, changing the state of data a temporal range or epoch at a time. In another embodiment, a rollback request and/or an iterate request may include an epoch identifier or another indicator of a state to which the time sequence interface module 306 is to rollback or iterate the data.

By providing support for a rollback request and/or an iterate request, in certain embodiments, the time sequence interface module 306 may allow storage clients 116 to rollback or return data to a state prior to a failed operation or the like. In this manner, even complex, multi-step operations on data may be considered transactional, as the operations may be undone or rolled back should an error or failure occur.

The time sequence interface module 306, in certain embodiments, may support one or more higher level time sequence operations using a combination of other, underlying time sequence operations. For example, the time sequence interface module 306 may use a sequence of one or more delta clone requests, rollback requests, iterate requests, and/or snapshot requests to service an asynchronous replication request from a storage client, to asynchronously replicate data, in the preserved temporal order, at a different storage location. The time sequence interface module 306, in certain embodiments, may replicate a state of data at a time an asynchronous replication request for the data is received. In one embodiment, the time sequence interface module 306 may use one or more delta clone requests to replay a history of changes to data between two points in time and to replicate the changes at a remote, separate location. For example, a storage client 116 may use an asynchronous replication request to synchronize databases between different servers in a temporal order, to destage data from a writeback cache to a backing store in a temporal order, or the like.

In other embodiments, a storage client 116 may use one or more delta clone requests, rollback requests, iterate requests, and/or snapshot requests directly to asynchronously replicate data itself. By supporting an asynchronous replication request and/or allowing a storage client 116 to use one or more delta clone requests, rollback requests, iterate requests, and/or snapshot requests, the time sequence interface module 306, in certain embodiments, allows a storage client 116 to replay, synchronize, or otherwise replicate a series of changes to or operations on data at a remote location, without maintaining separate metadata or a history of changes, as the temporal order module 304 preserves a temporal order of data and the time sequence interface module 306 provides access to the preserved temporal order.

The time sequence interface module 306, in certain embodiments, supports one or more commands for managing temporal ranges, epochs, and/or snapshots, such as a new epoch request or new snapshot request, a delete epoch request or delete snapshot request, a delete all request, an enumerate request, a report total request, a set epoch interval request, or the like. As described above, the temporal order module 304 may increment an epoch identifier and mark a temporal range or epoch of data with the incremented epoch identifier in response to a new epoch request, a new snapshot request, or the like, thereby creating or initializing a new epoch and/or snapshot.

In response to a new epoch request, a new snapshot request, or the like, the time sequence interface module 306 may quiesce, pause, hold, delay, or otherwise stop, at least temporarily, writes to the non-volatile memory device 120. The time sequence interface module 306, in response to quiescing or otherwise stopping writes, may write a snapshot-create note or other snapshot identifier or epoch identifier to an append point of the sequential, log-based writing structure of the non-volatile memory device 120. In other embodiments, the temporal order module 304 may begin using a new epoch identifier in response to a new epoch request, a new snapshot request, or the like without quiescing or otherwise stopping writes. The time sequence interface module 306, in certain embodiments, may add a new snapshot and/or epoch to a snapshot tree or other snapshot tracking data structure.

The time sequence interface module 306, in certain embodiments, deletes, removes, trims, invalidates, erases, or otherwise clears a temporal range of data, epoch, and/or snapshot in response to a delete epoch request, a delete snapshot request, or the like thereby freeing storage capacity of the non-volatile memory device 120. The time sequence interface module 306 may cooperate with the storage capacity recovery module 402 described below to satisfy a delete epoch request, a delete snapshot request, or the like. In a further embodiment, the storage capacity recovery module 402 may dynamically expire a temporal range of data, an epoch, and/or a delete snapshot request without a delete epoch request, a delete snapshot request, or the like. For example, the storage capacity recovery module 402 may delete, remove, trim, invalidate, erase, or otherwise clear an oldest epoch, an oldest snapshot, another selected epoch or snapshot, or the like, in response to an amount of data in the non-volatile memory device 120 satisfying a capacity threshold, or another expiration event.

To delete an epoch and/or snapshot, in one embodiment, the time sequence interface module 306 may write a snapshot-delete note or indicator to an append point of the sequential, log-based writing structure of the non-volatile memory device 120, to persist the delete operation or the like. The time sequence interface module 306, in a further embodiment, may delete or otherwise remove a snapshot from a snapshot tree or other snapshot tracking data structure, thereby preventing future attempts to access a deleted snapshot. Once the time sequence interface module 306 has marked a snapshot or epoch as deleted, in the sequential, log-based writing structure and/or in a snapshot-tree or the like, the storage capacity recovery module 402 may reclaim storage capacity associated with the deleted snapshot or epoch as described below.

In one embodiment, the time sequence interface module 306 supports a delete all request from a client 116. A delete all request may be to delete, clear, remove, erase, invalidate, trim, and/or discard all epochs, snapshots, and/or clones from the non-volatile memory device 120, all but a most recent epoch, snapshot, and/or clone, or the like. In a further embodiment, the time sequence interface module 306 supports an enumerate request from a client 116, to list or enumerate each epoch, snapshot, and/or clone from the non-volatile memory device 120, to list or enumerate each epoch, snapshot, and/or clone owned by an identified client 116, or the like to a requesting client 116. The time sequence interface module 306, in certain embodiments, may enumerate epochs, snapshots, and/or clones indexed or identified by epoch identifier, or the like, in response to an enumerate request.

In response to a report total request, in certain embodiments, the time sequence interface module 306 may list to a requesting client 116 how many epochs and/or snapshots exist for the non-volatile memory device 120, how many exist for and/or are owned by the requesting client 116, or the like. In one embodiment, the time sequence interface module 306 supports a set epoch interval request from a client 116, allowing the client 116 to define how often and/or set an interval, in units of time, that the temporal order module 304 increments or updates an epoch identifier to create a new epoch, snapshot, and/or clone.

Figure 4:
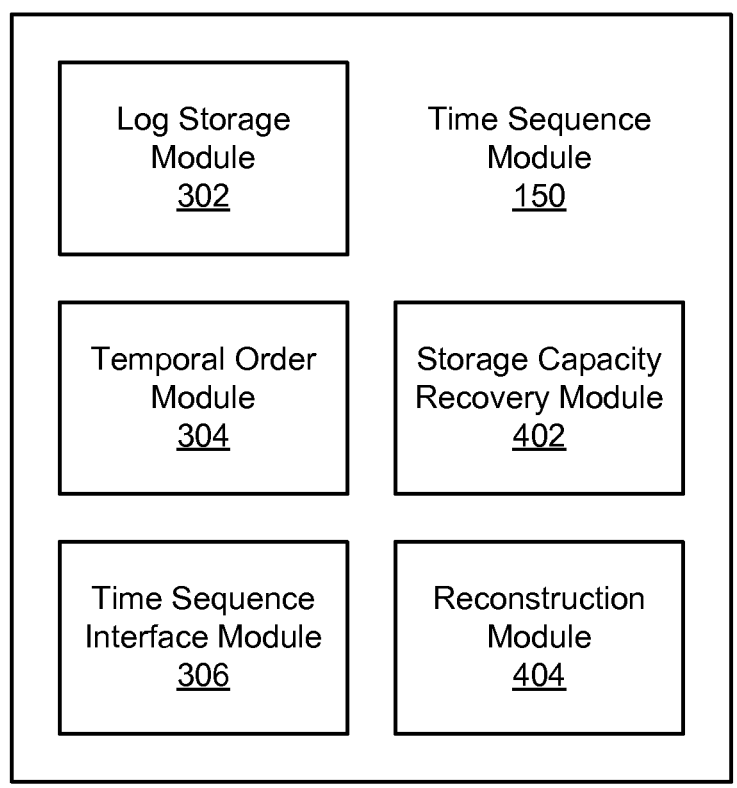
FIG. 4 is a schematic block diagram illustrating another embodiment of a time sequence module.

FIG. 4 depicts another embodiment of the time sequence module 150. The time sequence module 150 may be substantially similar to the time sequence module 150 described above with regard to FIGS. 1A, 1B, 2, and 3. In the depicted embodiment, the time sequence module 150 includes a log storage module 302, a temporal order module 304, and a time sequence interface module 306 substantially as described above and further includes a storage capacity recovery module 402 and a reconstruction module 404.

In one embodiment, the storage capacity recovery module 402 recovers storage capacity of physical non-volatile memory media 122 corresponding to data that is marked as invalid, such as data invalidated by a subsequent write request for one or more logical addresses of the data, data of an expired temporal range or epoch, or the like. The storage capacity recovery module 402, in certain embodiments, recovers storage capacity of physical non-volatile memory media 122 corresponding to invalid data opportunistically. For example, the storage capacity recovery module 402 may recover storage capacity in response to a storage capacity recovery event, such as a lack of available storage capacity, a percentage of data marked as invalid reaching a predefined threshold level, a consolidation of valid data, an error detection rate for a section of physical non-volatile memory media 122 reaching a threshold value, performance crossing a threshold value, a scheduled garbage collection cycle, identifying a section of the physical non-volatile memory media 122 with a high amount of invalid data, identifying a section of the physical non-volatile memory media 122 with a low amount of wear, or the like.

In one embodiment, the storage capacity recovery module 402 relocates valid data that is in a section of the physical non-volatile memory media 122 in the non-volatile memory device 120 that the storage capacity recovery module 402 is recovering to preserve the valid data. The storage capacity recovery module 402, in a further embodiment, relocates or copies forward data that is valid for any preserved temporal range, epoch, or snapshot, even if the data was subsequently invalidated. Erasing data without relocating the data evicts, removes, deletes, erases, or otherwise clears the data from the non-volatile memory device 120. The storage capacity recovery module 402, in one embodiment, may select one or more temporal ranges or epochs of data to expire or remove from the non-volatile memory device 120 (e.g., remove invalid data of the temporal range or epoch that is not associated with another temporal range) based on a delete epoch request from a storage client 116, based on an eviction policy, based on a determined cost for the temporal range or epoch, a frequency of use for data of the temporal range or epoch, or the like. In another embodiment, the storage capacity recovery module 402 clears or erases all invalid data in a section of the physical non-volatile memory media 122 that the storage capacity recovery module 402 has selected for grooming.

In one embodiment, the storage capacity recovery module 402 is part of an autonomous garbage collector system that operates within the non-volatile memory device 120. This allows the non-volatile memory device 120 to manage data to provide wear leveling so that data is systematically spread throughout the solid-state non-volatile memory media 122, or other physical storage media, to improve performance, data reliability, to avoid overuse and underuse of any one location or area of the solid-state non-volatile memory media 122, to lengthen the useful life of the solid-state non-volatile memory media 122, or the like.

The storage capacity recovery module 402, upon recovering a section of the physical non-volatile memory media 122, allows the non-volatile memory device 120 to re-use the section of the physical non-volatile memory media 122 to store different data. In one embodiment, the storage capacity recovery module 402 adds the recovered section of physical non-volatile memory media 122 to an available storage pool for the non-volatile memory device 120, or the like. The storage capacity recovery module 402, in one embodiment, erases existing data in a recovered section. In a further embodiment, the storage capacity recovery module 402 allows the non-volatile memory device 120 to overwrite existing data in a recovered section. Whether or not the storage capacity recovery module 402, in one embodiment, erases existing data in a recovered section may depend on the nature of the physical non-volatile memory media 122. For example, Flash media requires that cells be erased prior to reuse where magnetic media such as hard drives does not have that requirement. In an embodiment where the storage capacity recovery module 402 does not erase data in a recovered section, but allows the non-volatile memory device 120 to overwrite data in the recovered section, the storage capacity recovery module 402, in certain embodiments, may mark the data in the recovered section as unavailable to service read requests so that subsequent requests for data in the recovered section return a null result or an empty set of data until the non-volatile memory device 120 overwrites the data.

In one embodiment, the storage capacity recovery module 402 recovers storage capacity of the non-volatile memory device 120 one or more storage divisions at a time. A storage division, in one embodiment, includes a logical or physical erase block or other predefined division. For flash memory, an erase operation on an erase block writes ones to every bit in the erase block. This may be a lengthy process compared to a program operation which starts with a location being all ones, and as data is written, some bits are changed to zero. However, where the solid-state storage 110 is not flash memory or has flash memory where an erase cycle takes a similar amount of time as other operations, such as a read or a program, the time sequence interface module 306 may erase the data of a storage division as it deletes a temporal range or epoch of data, instead of the storage capacity recovery module 402.

In one embodiment, allowing the time sequence interface module 306 to mark data as invalid rather than actually erasing the data in response to a delete epoch request and allowing the storage capacity recovery module 402 to recover the physical media associated with invalid data, increases efficiency because, as mentioned above, for flash memory and other similar storage an erase operation may take a significant amount of time. Allowing the storage capacity recovery module 402 to operate autonomously and opportunistically within the non-volatile memory device 120 provides a way to separate erase operations from reads, writes, and other faster operations so that the non-volatile memory device 120 operates efficiently.

As described above, the temporal order module 304 may preserve the temporal and/or sequential order of data across a storage capacity recovery event as the storage capacity recovery module 402 copies data forward on the sequential, log-based writing structure, using epoch identifiers or the like. In certain embodiments, the storage capacity recovery module 402 is configured to copy data from a temporal range and one or more associated epoch identifiers forward to an append point of the sequential, log-based writing structure. In a further embodiment, the storage capacity recovery module 402 may copy data from a recovered temporal range of data or epoch to a different append point of the sequential, log-based writing structure than an intake append point, as described above, so that data from different temporal ranges or epochs remain separate in the sequential, log-based writing structure, or the like.

In embodiments where the temporal order module 304 preserves just a latest version of data for each temporal range or epoch, the storage capacity recovery module 402 may copy the latest version of data written in a temporal range or epoch forward to an append point of the sequential, log-based writing structure, and may erase, delete, remove, trim, or otherwise clear older invalid versions of the data during a storage capacity recovery operation. In other embodiments, the storage capacity recovery module 402 may preserve and copy forward multiple versions of data, both valid and invalid, from a temporal range or epoch.

In one embodiment, the reconstruction module 404 determines one or more logical-to-physical mappings for previous states of data (e.g., a temporal range or epoch of data, a snapshot, or the like) based on the temporal and/or sequential order that the temporal order module 304 preserves, so that the time sequence interface module 306 may use the logical-to-physical mappings to provide access to the previous states of data. The reconstruction module 404, in certain embodiments, may cooperate with the temporal order module 304 to rebuild or reconstruct a lost or damaged mapping structure as described above by scanning the sequential, log-based writing structure to locate epoch identifiers. The reconstruction module 404 may create mappings between the epoch identifiers (or associated logical addresses) and the physical locations in the non-volatile memory media 122 as the reconstruction module 404 scans the sequential, log-based writing structure.

In one embodiment, the reconstruction module 404 may determine or reconstruct a logical-to-physical mapping structure for a single snapshot, temporal range, or epoch, mapping logical addresses of the snapshot, temporal range, or epoch to the physical locations of the data in the sequential, log-based writing structure of the non-volatile memory media 122. In a further embodiment, where temporal ranges or epochs are contiguous within a sequential, log-based writing structure or the like, the reconstruction module 404 may determine or reconstruct a single logical-to-physical mapping structure for multiple snapshots, temporal ranges, or epochs that maps epoch identifiers to the contiguous location of the associated temporal ranges or epochs in the non-volatile memory media 122.

In one embodiment, the reconstruction module 404 may reconstruct a logical-to-physical mapping structure in response to a power failure, an improper shutdown, or another restart event, during a startup process for the non-volatile memory device 120 or the like. In the case of a proper shutdown, in certain embodiments, the temporal order module 304 may store one or more logical mappings for snapshots, temporal ranges, and/or epochs to a known or predetermined location in the non-volatile memory media 122, and the reconstruction module 404 may simply retrieve a logical-to-physical mapping structure from the non-volatile memory media 122 instead of reconstructing it. In a further embodiment, the reconstruction module 404 may dynamically determine or reconstruct a logical-to-physical mapping structure for the time sequence interface module 306 in response to a time sequence request or the like. For example, the reconstruction module 404 may apply one or more changes to an existing logical-to-physical mapping structure to service a delta clone request, a rollback request, an iterate request, a snapshot request, or the like, or may scan the sequential, log-based writing structure to determine a new logical-to-physical mapping structure to service a delta clone request, a rollback request, an iterate request, a snapshot request, or the like.

Figure 5:
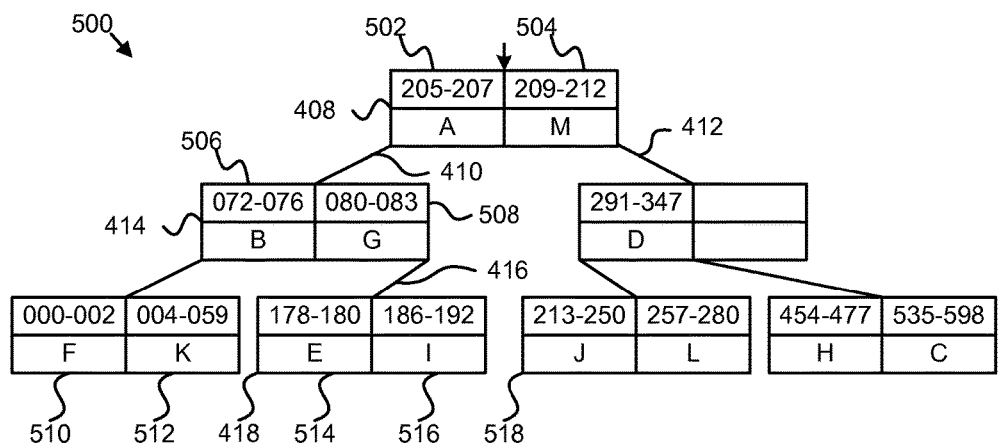
FIG. 5 is a schematic block diagram illustrating one embodiment of a mapping structure, a logical address space, a sequential, and a log-based, append-only writing structure.
Figure 5:
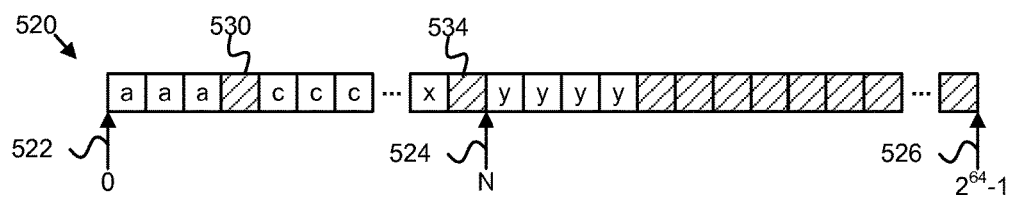
Figure 5:
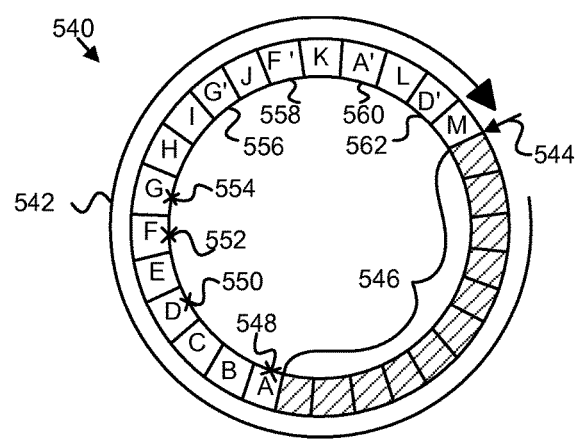

FIG. 5 depicts one embodiment of a mapping structure 500, a logical address space 520, and a sequential, log-based, append-only writing structure 540. The mapping structure 500, in one embodiment, may be maintained by the SML 130, the temporal order module 304, determined or reconstructed by the reconstruction module 404, of the like to map LBAs or other logical addresses to physical locations on the non-volatile memory media 122. The mapping structure 500 may be for all data stored on the non-volatile memory device 120, may be for a snapshot, temporal range, or epoch of data, or the like.

The mapping structure 500, in the depicted embodiment, is a B-tree with several entries. In the depicted embodiment, the nodes of the mapping structure 500 include direct references to physical locations in the non-volatile memory device 120. In other embodiments, the mapping structure 500 may include links that map to entries in a reverse map, or the like. The mapping structure 500, in various embodiments, may be used either with or without a reverse map. In other embodiments, the references in the mapping structure 500 may include alpha-numerical characters, hexadecimal characters, pointers, links, or the like.

The mapping structure 500, in the depicted embodiment, includes a plurality of nodes. Each node, in the depicted embodiment, is capable of storing two entries. In other embodiments, each node may be capable of storing a greater number of entries, the number of entries at each level may change as the mapping structure 500 grows or shrinks through use, or the like.

Each entry, in the depicted embodiment, maps a variable length range of LBAs of the non-volatile memory device 120 to a physical location in the non-volatile memory media 122 for the non-volatile memory device 120. Further, while variable length ranges of LBAs, in the depicted embodiment, are represented by a starting address and an ending address, in other embodiments, a variable length range of LBAs may be represented by a starting address and a length, or the like. In one embodiment, the capital letters 'A' through 'M' represent a logical or physical erase block in the physical non-volatile memory media 122 of the non-volatile memory device 120 that stores the data of the corresponding range of LBAs. In other embodiments, the capital letters may represent other physical addresses or locations of the non-volatile memory device 120. In the depicted embodiment, the capital letters 'A' through 'M' are also depicted in the log-based writing structure 540 which represents the physical non-volatile memory media 122 of the non-volatile memory device 120.

In the depicted embodiment, membership in the mapping structure 500 denotes membership (or storage) in the non-volatile memory device 120. In another embodiment, an entry may further include an indicator of whether the non-volatile memory device 120 stores data corresponding to a logical block within the range of LBAs, data of a reverse map, and/or other data. In further embodiments, membership in the mapping structure 500 may denote membership in a snapshot, temporal range or epoch of data associated with the mapping structure 500.

In the depicted embodiment, the root node 408 includes entries 502, 504 with noncontiguous ranges of LBAs. A "hole" exists at LBA "208" between the two entries 502, 504 of the root node. In one embodiment, a "hole" indicates that the non-volatile memory device 120 does not store data corresponding to one or more LBAs corresponding to the "hole." In one embodiment, the non-volatile memory device 120 supports block I/O requests (read, write, trim, etc.) with multiple contiguous and/or noncontiguous ranges of LBAs (i.e. ranges that include one or more "holes" in them). A "hole," in one embodiment, may be the result of a single block I/O request with two or more noncontiguous ranges of LBAs. In a further embodiment, a "hole" may be the result of several different block I/O requests with LBA ranges bordering the "hole."

In the depicted embodiment, similar "holes" or noncontiguous ranges of LBAs exist between the entries 506, 508 of the node 414, between the entries 510, 512 of the left child node of the node 414, between entries 514, 516 of the node 418, and between entries of the node 518. In one embodiment, similar "holes" may also exist between entries in parent nodes and child nodes. For example, in the depicted embodiment, a "hole" of LBAs "060-071" exists between the left entry 506 of the node 414 and the right entry 512 of the left child node of the node 414.

The "hole" at LBA "003," in the depicted embodiment, can also be seen in the logical address space 520 of the non-volatile memory device 120 at logical address "003" 530. The hash marks at LBA "003" 540 represent an empty location, or a location for which the non-volatile memory device 120 does not store data. The "hole" at LBA 534 in the logical address space 520, is due to one or more block I/O requests with noncontiguous ranges, a trim or other deallocation command to the non-volatile memory device 120, or the like. The mapping structure 500 supports "holes," noncontiguous ranges of LBAs, and the like due to the sparse and/or thinly provisioned nature of the logical address space 520.

The logical address space 520 of the non-volatile memory device 120 (or of a particular snapshot, temporal range or epoch), in the depicted embodiment, is sparse and/or thinly provisioned, and is larger than the physical storage capacity and corresponding storage device address space of the non-volatile memory device 120. In the depicted embodiment, the non-volatile memory device 120 has a 64 bit logical address space 520 beginning at logical address "0" 522 and extending to logical address "$2^{64}-1$" 526. Because the physical address space corresponds to only a subset of the logical address space 520 of the non-volatile memory device 120, the rest of the logical address space 520 may be allocated, mapped, and used for other functions of the non-volatile memory device 120.

The sequential, log-based, append-only writing structure 540, in the depicted embodiment, is a logical representation of the physical non-volatile memory media 122 of the non-volatile memory device 120. In certain embodiments, the non-volatile memory device 120 stores data sequentially, appending data to the log-based writing structure 540 at one or more append points 544. The non-volatile memory device 120, in a further embodiment, uses a storage space recovery process, such as the storage capacity recovery module 402, that re-uses non-volatile memory media 122 storing deallocated/unused logical blocks. Non-volatile memory media 122 storing deallocated/unused logical blocks, in the depicted embodiment, is added to an available storage pool 546 for the non-volatile memory device 120. By clearing invalid data from the non-volatile memory device 120, as described above, and adding the physical storage capacity corresponding to the cleared data back to the available storage pool 546, in one embodiment, the log-based writing structure 540 is cyclic, ring-like, and has a theoretically infinite capacity.

In the depicted embodiment, the append point 544 progresses around the log-based, append-only writing structure 540 in a circular pattern 542. In one embodiment, the circular pattern 542 wear balances the non-volatile memory media 122, increasing a usable life of the non-volatile memory media 122. In the depicted embodiment, the storage capacity recovery module 402 has marked several blocks 548, 550, 552, 554 as invalid, represented by an "X" marking on the blocks 548, 550, 552, 554. The storage capacity recovery module 402, in one embodiment, will recover the physical storage capacity of the invalid blocks 548, 550, 552, 554 and add the recovered capacity to the available storage pool 546. In other embodiments, the storage capacity recovery module 402 may preserve at least a most recent copy of data from each temporal range or epoch in the invalid blocks 548, 550, 552, 554, so that the time sequence interface module 306 may provide access to snapshots or other previous states of the data to satisfy time sequence requests or the like. In the depicted embodiment, modified versions of the blocks 548, 550, 552, 554 have been appended to the log-based writing structure 540 as new blocks 556, 558, 560, 562 in a read, modify, write operation or the like, allowing the original blocks 548, 550, 552, 554 to be recovered.

Figure 6A:
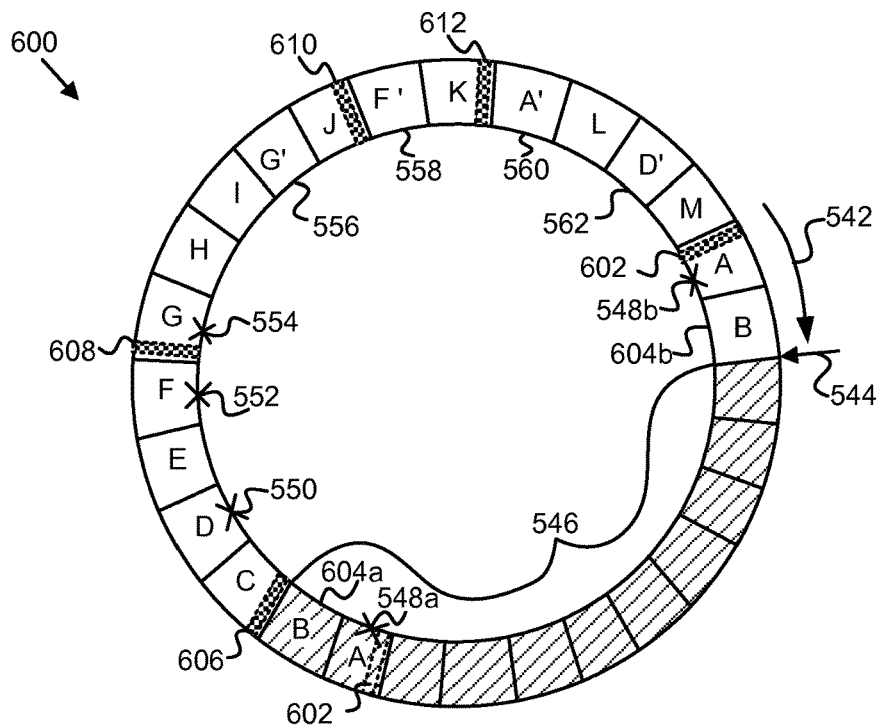
FIG. 6A is a schematic block diagram illustrating one embodiment of an epoch identifier.

FIG. 6A depicts one embodiment of a sequential, log-based writing structure 600 storing epoch identifiers 602, 606, 608, 610, 612. As described above, an epoch identifier 602, 606, 608, 610, 612 may include an indicator, marker, label, flag, field, packet, or other data structure identifying or preserving a temporal and/or sequential order for data in the sequential, log-based writing structure 600. An epoch identifier 602, 606, 608, 610, 612 may be absolute (e.g., a timestamp), relative (e.g., a sequence number), or may otherwise indicate a temporal and/or sequential order for data.

In the depicted embodiment, the temporal order module 304 marks or associates data with an epoch identifier 602, 606, 608, 610, 612 by inserting the epoch identifier 602, 606, 608, 610, 612 into the sequential, log-based writing structure 600 between temporal ranges or epochs of data. An epoch identifier 602, 606, 608, 610, 612, in the depicted embodiment, marks the beginning of a new temporal range or epoch of data, with all data between the epoch identifier 602, 606, 608, 610, 612 and a subsequent or next epoch identifier 602, 606, 608, 610, 612 belonging to the temporal range.

In the depicted embodiment, the storage capacity recovery module 402 has performed a storage capacity recovery operation to recover blocks 548a and 604a which stored data 'A' and 'B' associated with epoch identifier 602. To preserve the temporal and/or sequential order of data in the sequential, log-based writing structure 600, the temporal order module 304, in cooperation with the storage capacity recovery module 402 or the like, has copied or written forward the data of the temporal range associated with the epoch identifier 602 (e.g., data 'A' and 'B') from blocks 548a, 604a to blocks 548b and 604b at the append point 544 of the sequential, log-based writing structure 600, along with the epoch identifier 602. Even though data 'A' of block 548a has been invalidated by new data, as described above with regard to FIG. 5, the temporal order module 304 and/or the storage capacity recovery module 402 retain data 'A' of block 548a during the storage capacity recovery operation, so that the time sequence interface module 306 may provide access to both versions of data 'A' 548, 560.

In this manner, the data remains associated with the epoch identifier 602 across storage capacity recovery events, and the sequential, log-based writing structure 600 continues to maintain a temporal and/or sequential order of data. Additionally, by marking the beginning and/or ending of temporal ranges or epochs of data with epoch identifiers 602, 606, 608, 610, 612, in one embodiment, the temporal order module 304 preserves a temporal and/or sequential order for data without the overhead of storing an epoch identifier 602, 606, 608, 610, 612 in each packet or other predefined data segment.

Figure 6B:
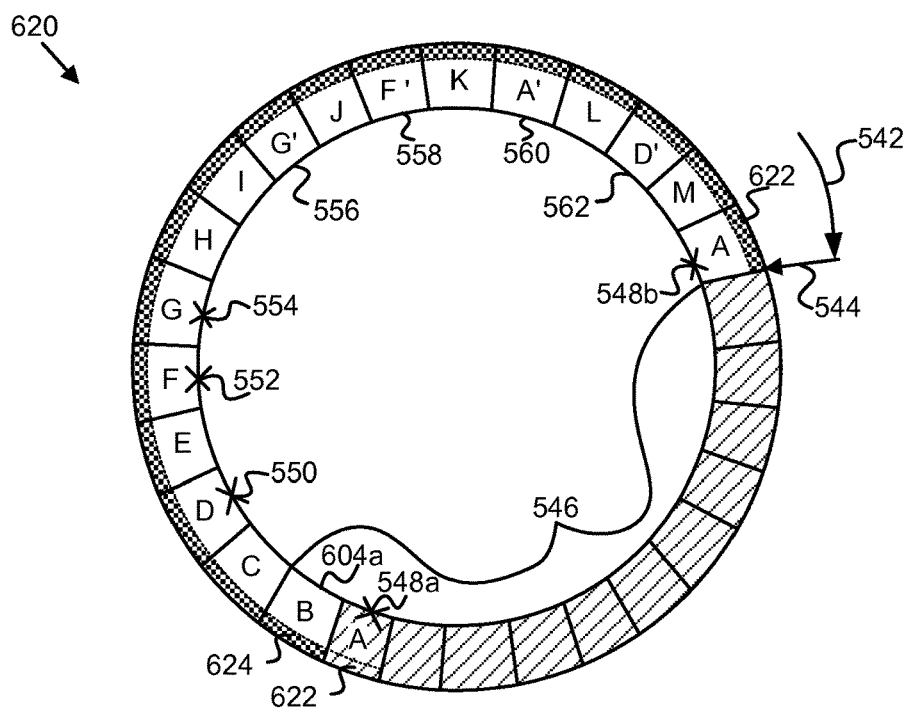
FIG. 6B is a schematic block diagram illustrating another embodiment of an epoch identifier.

FIG. 6B depicts another embodiment of a sequential, log-based writing structure 620 storing epoch identifiers 622, 624. In the sequential, log-based writing structure 620, the temporal order module 304 inserts or stores an epoch identifier 622, 624 into each individual data segment, such as a packet, an ECC chunk or block, a logical page, a physical page, a logical erase block, a physical erase block, an LBA data block or range of data blocks, a file, a data object, or another predefined segment of data.

In the depicted embodiment, because each individual packet or other data segment includes an epoch identifier, the storage capacity recovery module 402 may recover the storage capacity of block 548a, with data 'A', copying or writing forward data 'A' to a block 548b at the append point 544, without copying or writing forward data 'B' from block 604a, which may be associated with the same epoch identifier 624. Data packets or other data segments of data 'A' in block 548a store epoch identifiers 622, which the temporal order module 304 and/or the storage capacity recovery module 402 copy or write forward with data 'A' to the new block 548b. The matching epoch identifiers 624a for data 'B' remain associated with data in each data packet or other data segment, in block 604a. In certain embodiments, storing an epoch identifier 622, 624 in each packet or other data segment may simplify storage capacity recovery operations for the storage capacity recovery module 402, as temporal ranges or epochs may be separated, without the data losing its association with the epoch identifiers 622, 644.

Figure 7:
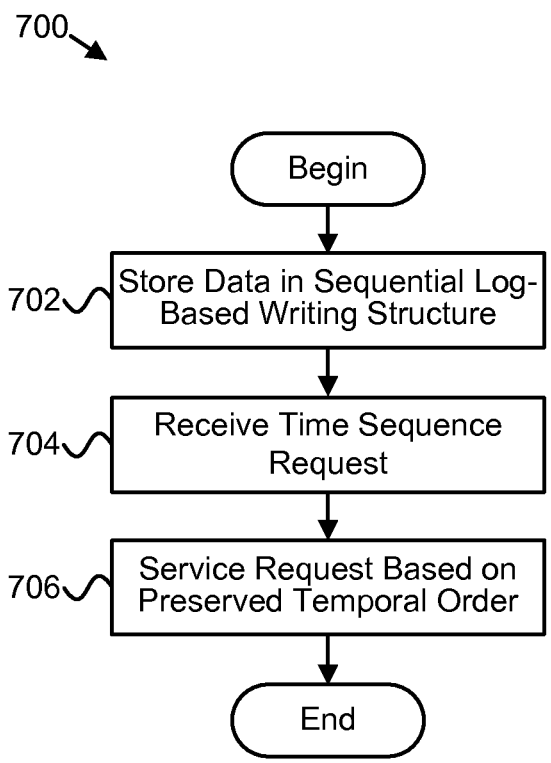
FIG. 7 is a schematic flow chart diagram illustrating one embodiment of a method for time sequence data management.

FIG. 7 depicts one embodiment of a method 700 for time sequence data management. The method 700 begins and the log storage module 302 stores 702 data in a sequential, log-based writing structure 540, 600, 620. The time sequence interface module 306 receives 704 a time sequence request from a client 116. The time sequence interface module 306 services 706 the received 704 time sequence request based on a temporal order of the data preserved in the sequential, log-based writing structure 540, 600, 620 and the method 700 ends.

Figure 8:
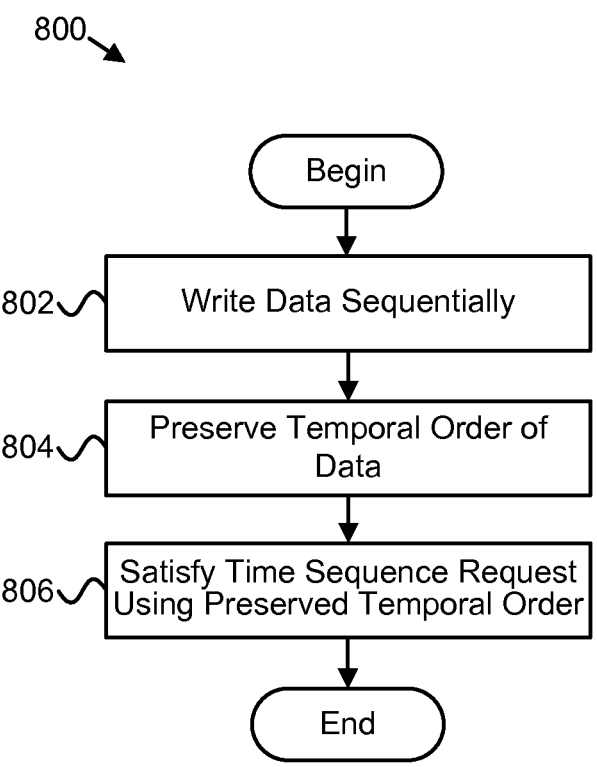
FIG. 8 is a schematic flow chart diagram illustrating another embodiment of a method for time sequence data management.

FIG. 8 depicts another embodiment of a method 800 for time sequence data management. The method 800 begins and the log storage module 302 writes 802 data sequentially to an append point 544 of a sequential, log-based writing structure 540, 600, 620. The temporal order module 304 preserves 804 a temporal order of the data in the sequential, log-based writing structure 540, 600, 620. The time sequence interface module 306 satisfies 806 time sequence requests using the preserved 804 temporal order and the method 800 ends.

Figure 9:
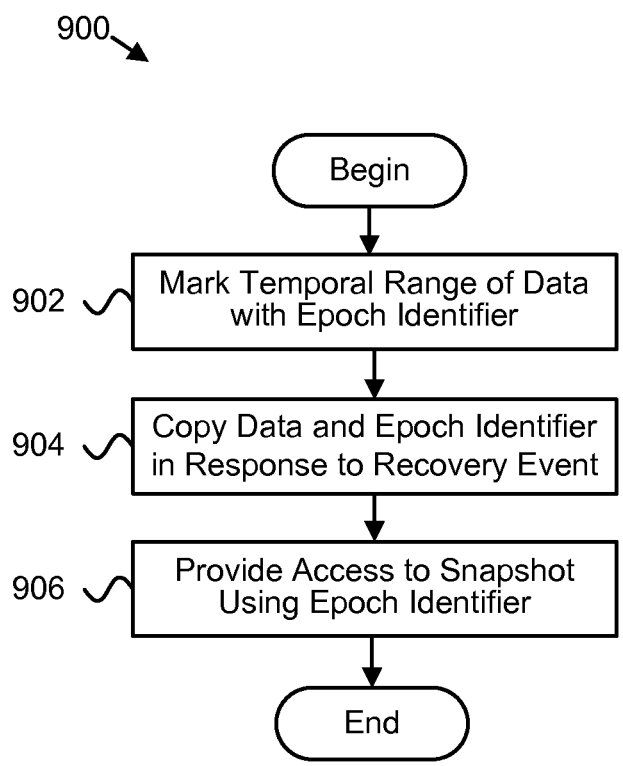
FIG. 9 is a schematic flow chart diagram illustrating a further embodiment of a method for time sequence data management.

FIG. 9 depicts a further embodiment of a method 900 for time sequence data management. The method 900 begins and the temporal order module 304 marks 902 a temporal range of data in a sequential, log-based writing structure 540, 600, 620 with an epoch identifier 602, 606, 608, 610, 612, 622, 624. The temporal order module 304 and/or the storage capacity recovery module 402 copies 904 at least a latest version of data in the temporal range and the epoch identifier 602, 606, 608, 610, 612, 622, 624 forward on the sequential, log-based writing structure 540, 600, 620 in response to a storage capacity recovery event. The time sequence interface module 306 provides 906 access to a snapshot of the temporal range of data using the epoch identifier 602, 606, 608, 610, 612, 622, 624.

Figure 10:
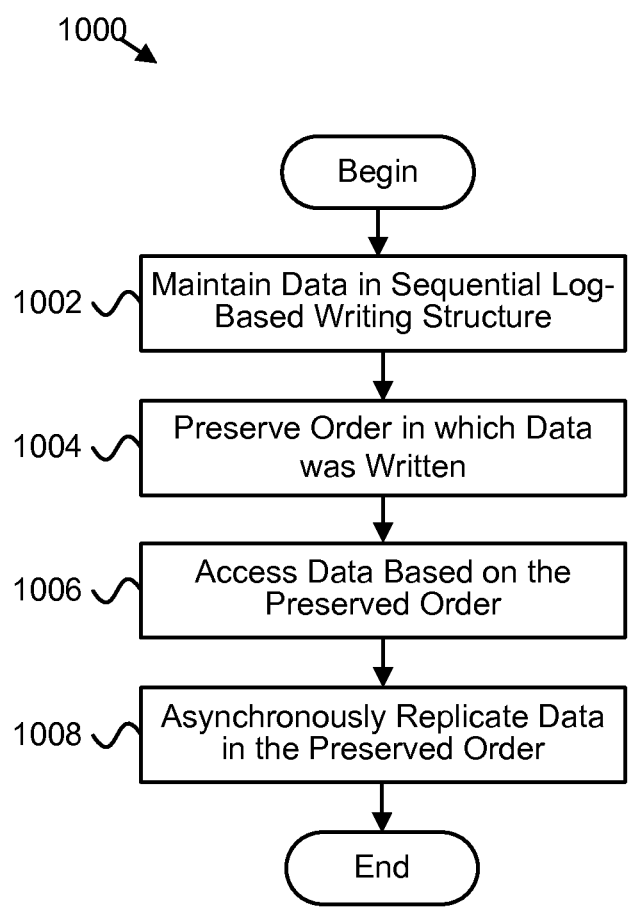
FIG. 10 is a schematic flow chart diagram illustrating an additional embodiment of a method for time sequence data management.

FIG. 10 depicts an additional embodiment of a method 1000 for time sequence data management. The log storage module 302 maintains 1002 data in a sequential, log-based writing structure 540, 600, 620. The temporal order module 304 preserves 1004 an order in which the data was written. The time sequence interface module 306 accesses 1006 the data based on the order in which the data was written. In certain embodiments, the time sequence interface module 306, in cooperation with a client 116 or the like, asynchronously replicates 1008 the data, at a remote location, in the order in which the data was written. The method 1000 ends.

A means for maintaining data in a sequential, log-based writing structure 540, 600, 620, in various embodiments, may include a log storage module 137, 248, 302, a time sequence module 150, a storage management layer 130, a non-volatile memory controller 124, a non-volatile memory media controller 126, a non-volatile memory device 120, non-volatile memory media 122, a write pipeline 240, other logic hardware, and/or other executable code stored on a computer readable storage medium. Other embodiments may include similar or equivalent means for maintaining data in a sequential, log-based writing structure 540, 600, 620.

A means for preserving, across a storage capacity recovery event, an order in which the data was written, in various embodiments, may include a temporal order module 304, a storage capacity recovery module 402, a time sequence module 150, a log storage module 137, 248, 302, a storage management layer 130, a non-volatile memory controller 124, a non-volatile memory media controller 126, a non-volatile memory device 120, a write pipeline 240, other logic hardware, and/or other executable code stored on a computer readable storage medium. Other embodiments may include similar or equivalent means for preserving, across a storage capacity recovery event, an order in which the data was written.

A means for accessing the data based on the order in which the data was written, in various embodiments, may include a time sequence interface module 306, a time sequence module 150, a storage management layer 130, a non-volatile memory controller 124, a non-volatile memory media controller 126, a non-volatile memory device 120, a read pipeline 241, other logic hardware, and/or other executable code stored on a computer readable storage medium. Other embodiments may include similar or equivalent means for accessing the data based on the order in which the data was written.

A means for asynchronously replicating the data, at a remote location, in the order in which the data was written, in various embodiments, may include a time sequence interface module 306, a time sequence module 150, a storage management layer 130, a non-volatile memory controller 124, a read pipeline 241, a storage client 116, other logic hardware, and/or other executable code stored on a computer readable storage medium. Other embodiments may include similar or equivalent means for asynchronously replicating the data, at a remote location, in the order in which the data was written.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
   storing, in a memory device, a sequential, log-based writing structure comprising data and one or more epoch identifiers written with the data, wherein the one or more epoch identifiers are associated with one or more temporal ranges of data, and are stored in one or more metadata headers of the one or more associated temporal ranges of data;
   preserving a temporal order of data in the sequential, log-based writing structure in response to storage capacity recovery events, wherein: the storage capacity recovery events comprise garbage collection cycles that change a location of data within the sequential, log-based writing structure by relocating data from a storage region and erasing the storage region; and
   preserving the temporal order comprises changing a location of an epoch identifier within the sequential, log-based writing structure by relocating the epoch identifier with the data; and
   servicing a time sequence request comprising a snapshot request, by providing a client with read and write access to data corresponding to a snapshot epoch identifier, from the sequential, log-based writing structure, based on the temporal order, without affecting data associated with a current epoch identifier.

2. The method of claim 1, wherein the storage capacity recovery events write valid data from a set of storage media to an append point of the sequential, log-based writing structure.

3. The method of claim 1, wherein the one or more epoch identifiers mark the one or more temporal ranges of data.

4. The method of claim 2, wherein preserving the temporal order of the data in response to the storage capacity recovery events comprises retaining at least one version of data from each of a plurality of epochs.

5. The method of claim 1, wherein the data corresponding to the snapshot epoch identifier comprises a snapshot of data from a point in time based on the temporal order.

6. The method of claim 1, wherein:
   the time sequence request further comprises a delta clone request; and
   servicing the delta clone request comprises providing, to the client, changes to the data between points in time based on the temporal order.

7. The method of claim 6, wherein the changes to the data are provided in one or more of the temporal order and a logical address order for the data.

8. The method of claim 1, wherein:
the time sequence request further comprises a rollback request; and
servicing the rollback request comprises providing access to a previous state of the data based on the temporal order.

9. The method of claim 8, further comprising providing access to a state of the data adjacent in time to the previous state based on the temporal order in response to an iterate request.

10. The method of claim 8, further comprising determining a logical-to-physical mapping for the previous state of the data based on the temporal order, the logical-to-physical mapping comprising a mapping between logical addresses of the data and physical locations for the previous state of the data in the sequential, log-based writing structure.

11. The method of claim 8, wherein the previous state comprises a state of the data prior in the temporal order to a failed operation.

12. The method of claim 1, wherein:
the time sequence request further comprises an asynchronous replication request; and
servicing the asynchronous replication request comprises asynchronously replicating the data, in the temporal order, to a different storage location.

13. An apparatus comprising:
a log storage module configured to store, in a memory device, a sequential, log-based writing structure comprising data and one or more epoch identifiers written with the data, wherein the one or more epoch identifiers are associated with one or more chronological spans of data, and are stored in one or more metadata headers of the one or more associated chronological spans of data;
a temporal order module configured to preserve a temporal order of data in the sequential, log-based writing structure in response to storage capacity recovery events, wherein: the storage capacity recovery events comprise garbage collection cycles that change a location of data within the sequential, log-based writing structure by relocating data from a storage region and erasing the storage region; and
preserving the temporal order comprises changing a location of an epoch identifier within the sequential, log-based writing structure by relocating the epoch identifier with the data; and a time sequence interface module configured to service a time sequence request comprising a snapshot request, by providing a client with read and write access to data corresponding to a snapshot epoch identifier from the sequential, log-based writing structure, based on the temporal order, without affecting data associated with a current epoch identifier,
wherein at least a portion of the log storage module, the temporal order module, and the time sequence interface module comprise one or more of hardware and executable code, the executable code stored on one or more non-transitory computer readable storage media.

14. The apparatus of claim 13, further comprising a storage capacity recovery module configured to relocate a chronological span of data and an epoch identifier associated with the chronological span of data to a different append point of the sequential, log-based writing structure than an intake append point in response to a storage capacity recovery event.

15. The apparatus of claim 13, wherein the temporal order module is configured to increment an epoch identifier associated with a chronological span of data for association with a subsequent chronological span of data in response to a time sequence request comprising a new span request.

16. A system for time sequence data management, the system comprising:
a memory device configured to store a sequential, log-based writing structure comprising data and one or more epoch identifiers written with the data, wherein the one or more epoch identifiers are associated with one or more temporal ranges of data, and are stored in one or more metadata headers of the one or more associated temporal ranges of data;
a temporal order module configured to preserve a temporal order of data in the sequential, log-based writing structure in response to storage capacity recovery events, wherein: the storage capacity recovery events comprise garbage collection cycles that change a location of data within the sequential, log-based writing structure by relocating data from a storage region and erasing the storage region; and
preserving the temporal order comprises changing a location of an epoch identifier within the sequential, log-based writing structure by relocating the epoch identifier with the data; and
a time sequence interface module configured to service a time sequence request comprising a snapshot request, by providing a client with read and write access to data corresponding to a snapshot epoch identifier, from the sequential, log-based writing structure, based on the temporal order, without affecting data associated with a current epoch identifier, wherein at least a portion of the temporal order module and the time sequence interface module comprise one or more of hardware and executable code, the executable code stored on one or more non-transitory computer readable storage media.

17. The system of claim 16, further comprising a host computing device in communication with the memory device, wherein the temporal order module and the time sequence interface module are configured to execute on the host computing device.

18. A computer program product comprising a non-transitory computer readable storage medium storing computer usable program code executable to perform operations for time sequence data management, the operations comprising:
marking a chronological period of data in a sequential journal with an era identifier in the sequential journal, wherein the era identifier that marks the chronological period of data is stored in one or more metadata headers of the chronological period of data;
preserving at least one version of data from the chronological period in the sequential journal in response to a storage capacity recovery event for the chronological period, wherein the storage capacity recovery event comprises a garbage collection cycle that changes a location of data and a location of the era identifier within the sequential journal by relocating data from a storage region, relocating the era identifier with the data, and erasing the storage region; and
providing a client with read and write access to a snapshot of the chronological period of data using the era identifier, without affecting data associated with a current era identifier.

19. The computer program product of claim 18, wherein marking the chronological period comprises storing the era identifier in one or more metadata headers for the chronological period of data.

20. The computer program product of claim 18, wherein marking the chronological period comprises storing the era identifier in the sequential journal at a beginning of the chronological period of data.

21. An apparatus for time sequence data management, the apparatus comprising:
- means for maintaining data with one or more epoch identifiers in a sequential log writing structure, wherein the one or more epoch identifiers are associated with one or more temporal ranges of data, and are stored in one or more metadata headers of the one or more associated temporal ranges of data;
- means for preserving, in response to a storage capacity recovery event, an order in which the data is written, wherein: the storage capacity recovery event comprises a garbage collection cycle that changes a location of data within the sequential log writing structure by relocating data from a storage region and erasing the storage region; and
- preserving the order comprises changing a location of an epoch identifier within the sequential log writing structure by relocating the epoch identifier with the data; and
- means for servicing a time sequence request comprising a snapshot request, by providing a client with read and write access to data corresponding to a snapshot epoch identifier, based on the order in which the data is written, without affecting data associated with a current epoch identifier.

22. The apparatus of claim 21, further comprising means for asynchronously replicating the data, at a remote location, in the order in which the data is written.

* * * * *